(12) United States Patent
Sankar et al.

(10) Patent No.: US 9,276,440 B2
(45) Date of Patent: Mar. 1, 2016

(54) MULTI-MODE MULTI-COUPLING MULTI-PROTOCOL UBIQUITOUS WIRELESS POWER TRANSMITTER

(71) Applicant: WIPQTUS Inc, Cupertino, CA (US)

(72) Inventors: Ganapathy Sankar, Cupertino, CA (US); Manjit Singh, Fremont, CA (US)

(73) Assignee: WIPQTUS INC., Cupertino, CA (US)

( * ) Notice: Subject to any disclaimer, the term of this patent is extended or adjusted under 35 U.S.C. 154(b) by 386 days.

(21) Appl. No.: 13/958,636

(22) Filed: Aug. 5, 2013

(65) Prior Publication Data

US 2014/0139034 A1     May 22, 2014

Related U.S. Application Data

(60) Provisional application No. 61/679,910, filed on Aug. 6, 2012, provisional application No. 61/730,068, filed on Nov. 27, 2012.

(51) Int. Cl.
*H02J 17/00*     (2006.01)
*H02J 7/02*     (2006.01)
*H02J 7/00*     (2006.01)

(52) U.S. Cl.
CPC ............. *H02J 17/00* (2013.01); *H02J 7/025* (2013.01); *H02J 7/0042* (2013.01)

(58) Field of Classification Search
None
See application file for complete search history.

(56) References Cited

U.S. PATENT DOCUMENTS

| 2010/0084918 | A1* | 4/2010 | Fells | H02J 5/005 307/32 |
| 2012/0112691 | A1* | 5/2012 | Kurs | B60L 11/182 320/108 |
| 2014/0015331 | A1* | 1/2014 | Kim | H01F 38/14 307/104 |

* cited by examiner

*Primary Examiner* — Jared Fureman
*Assistant Examiner* — Joel Barnett
(74) *Attorney, Agent, or Firm* — Lipton, Weinberger & Husick; Ash Tankha

(57) ABSTRACT

A multi-mode multi-coupling multi-protocol wireless power transmitter (WPT) and its embodiments transmit power to a wireless power receiver (WPR) in a power transfer mode (PTM) and a wireless power protocol (WPP) of the WPR. A first circuit of the WPT includes inductors or capacitors emanating power via a magnetic field or electric field PTM respectively. The WPT sequentially parses a test condition to identify a PTM, a power coupling linkage (PCL) between the WPT and the WPR, and a WPP of the WPR. The WPT identifies a match if the PTM of the first circuit and the WPP of the switch network, the variable matching circuit, a modulator/demodulator block or an out-of-band communication block, and a control logic circuit of the WPT match the PTM and the WPP of the WPR to transmit power to the WPR based on the match.

20 Claims, 13 Drawing Sheets

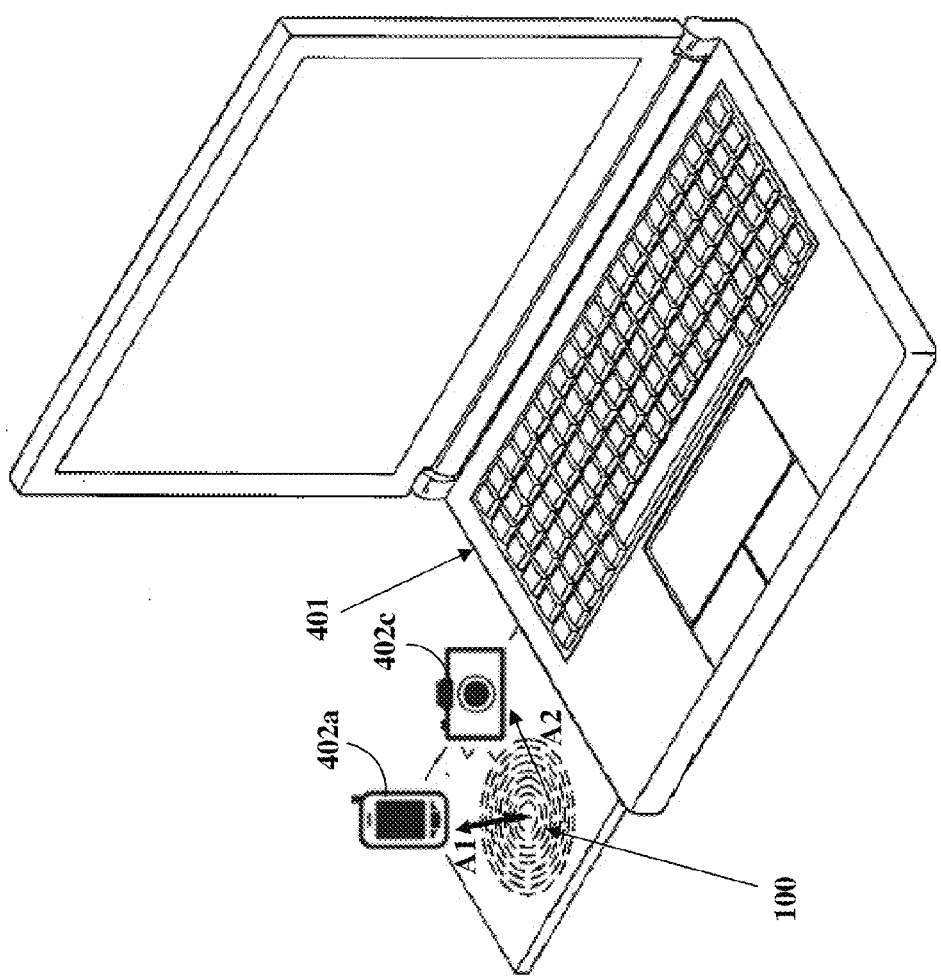

MULTI-MODE MULTI-COUPLING MULTI-PROTOCOL UBIQUITOUS WIRELESS POWER TRANSMITTER

CROSS REFERENCE TO RELATED APPLICATIONS

This application claims the benefit of the following patent applications:
1. Provisional patent application No. 61/679,910 titled "Multi-mode Multi-protocol Wireless Power Transmitter", filed in the United States Patent and Trademark Office on Aug. 6, 2012.
2. Provisional patent application No. 61/730,068 titled "Multi-mode Multi-protocol Wireless Power Transmitter", filed in the United States Patent and Trademark Office on Nov. 27, 2012.

The specifications of the above referenced patent applications are incorporated herein by reference in their entirety.

BACKGROUND

From a technology perspective, the wireless power world is very fragmented. Wireless power can be delivered via magnetic inductive mode or electrostatic capacitive mode. In the magnetic inductive mode, the wireless power systems are configured to operate either at a resonant fixed operating point or in a non-resonant variable operating regime. The resonant scheme is typically used when the level of magnetic field coupling between the wireless power transmitter and the wireless power receiver is weak while the non-resonant schemes are used when the level of magnetic field coupling is strong. And within the resonant and non-resonant schemes, there are multiple flavors and communication protocols between the wireless power transmitter and wireless power receiver.

Original equipment manufacturers (OEMs) and consumers have real trouble understanding and sorting through these varied technologies. As a result, market adoption of wireless power technology has stagnated. Attempts are being made to converge these diverse approaches but given the differences, it is very hard to unify and gain agreement for a common standard. In such a wireless power technology fragmented world, a universal wireless power charger that supports multiple modes, multiple coupling schemes and multiple protocols is the smarter and simpler solution. It would provide great flexibility for consumers to own and enjoy mobile devices that have different wireless power technologies integrated or externally attached to the mobile device.

Wireless power systems in the market today are not flexible; they operate in a single wireless power transfer mode, operate in one of either weak or strongly coupled scheme and typically support only one wireless power protocol. They are usually limited in the type and power range of devices that they can wirelessly charge. Most wireless power transmitters charge mobile phones and lack the construction to effectively wirelessly charge higher power devices such as tablets and notebooks or ultra-low power devices such as Bluetooth headsets. Having different wireless power transmitter sources for different types of devices would be cumbersome and adding to the chaos created by existing disparate wired charging solutions. It would be great convenience for consumers to charge their mobile devices such as their cameras, Bluetooth headsets, game controllers, mobile phones, tablets, notebooks etc., all from the same wireless power transmitter source. Besides, consumers would more readily embrace wireless power if wireless power were ubiquitously available around them. In every room, there is a wall-wart that provides wired power; similarly, in every room, there would need to be a source of wireless power to wirelessly charge portable devices. It would be space prohibitive and uneconomical to consider a wireless power pad in every room. An alternate approach would be to purposefully develop and smoothly integrate the wireless power transmitter into other non-portable devices such as a liquid crystal display (LCD) monitor, a printer, a television, etc.

Therefore, there is an unmet need for a multi-mode multi-coupling multi-protocol wireless power transmitter that interoperates with a large range of wireless power receivers that operate in different power transfer modes with different levels of magnetic flux and electrostatic linkages and wireless power protocols, scales smoothly to satisfy the power needs of different wireless power receivers, and integrates easily into a portable electronic device or a non-portable electronic device, for providing flexible, scalable, and ubiquitous availability of untethered power to the wireless power receivers located in the vicinity of the wireless power transmitter.

SUMMARY OF THE INVENTION

The wireless power transmitter disclosed herein can be flexibly and extendably positioned and integrated into a portable electronic device or a non-portable electronic device for providing flexible, scalable, and ubiquitous transmission of untethered power to one or more wireless power receivers located in the vicinity of the wireless power transmitter. The wireless power transmitter disclosed herein transmits power to any wireless power receiver positioned at multiple locations atop, near, and around the wireless power transmitter. The wireless power transmitter disclosed herein can be flexibly withdrawn, for example, ejected out, rolled out, popped out, slid out, swiveled out, folded out, etc., from the portable electronic device or the non-portable electronic device or plugged in, for example, as a personal computer memory card international association (PCMCIA) card, a universal serial bus (USB) flash memory card, etc., into the main body of the portable electronic device or the non-portable electronic device.

In an embodiment, the wireless power transmitter disclosed herein can be integrated into a pedestal, a stand, or a base of the portable electronic device or the non-portable electronic device. In another embodiment, the wireless power transmitter disclosed herein can be integrated into a standalone device that draws power from a wall wart. In another embodiment, the wireless power transmitter disclosed herein is configured as a peripheral accessory that draws power from the portable electronic device or the non-portable electronic device.

The multi-mode multi-coupling multi-protocol wireless power transmitter disclosed herein is configured to identify the power transfer mode, the power coupling linkage between the wireless power transmitter and the wireless power receiver, and the wireless power protocol of the wireless power receiver. As used herein, the term "power coupling linkage" refers to the strength of a field linkage, for example, a magnetic flux field linkage or an electrostatic field linkage between the wireless power receiver and the wireless power transmitter. For example, when the wireless power receiver is first placed on the wireless power transmitter, the power coupling linkage between them may not be strong enough and the wireless power receiver may not be receiving sufficient power to power up. In such a case, a "multi-coupling" wireless power transmitter would sense the level of coupling and tune its power transmission circuitry to transmit higher power than previously so as to power up the wireless power receiver. This capability of the wireless power transmitter to handle varied strengths of field linkages between the wireless power transmitter and receiver by sensing the level of coupling and adapting itself suitably is referred herein as "multi-coupling". A wireless power transmitter that lacks such a capability is referred herein as "non-multi-coupling". A non-multi-coupling wireless power transmitter does not adapt itself so when the power coupling linkage is below the designed limit, the wireless power receiver will not receive sufficient power to power up or if its powered up, it may not be able to deliver the full requested power to its load as it is not getting the required power from the wireless power transmitter.

The wireless power transmitter disclosed herein comprises a switch network configured to receive power from a power source, a variable matching circuit, a first circuit, an analog to digital converter (ADC) block, a modulator/demodulator block, an out-of-band communication block, and a control logic circuit. The variable matching circuit is connected between the switch network and the first circuit. The variable matching circuit comprises a tank circuit. The tank circuit of the variable matching circuit comprises one or more of passive electronic components, active electronic components, and electronic switches. The variable matching circuit and the switch network are configured to tune transmission of power to the wireless power receiver based on the power coupling linkage between the wireless power transmitter and the wireless power receiver.

The first circuit is connected to the variable matching circuit and comprises one or more inductors and/or one or more capacitors configured to emanate power via a magnetic field and/or an electric field respectively. The first circuit is configured to transmit power to the wireless power receiver via one of multiple power transfer modes comprising a magnetic field power transfer mode and an electric field power transfer mode. That is, the magnetic field power transfer mode and the electric field power transfer mode represent the modes of transfer of power from the wireless power transmitter to the wireless power receiver. The modulator/demodulator block of the wireless power transmitter is configured to transmit and receive messages to and from the wireless power receiver in one of multiple wireless power protocols. The out-of-band communication block is also configured to transmit and receive messages to and from the wireless power receiver in one of multiple wireless power protocols and can be used by the wireless power transmitter as an alternate to the modulator/demodulator block for transmitting and receiving messages to and from the wireless power receiver. The wireless power receiver communicates as per the specification of one of multiple wireless power protocols.

The wireless power transmitter disclosed herein senses the power coupling linkage between the wireless power transmitter and the wireless power receiver by measuring a voltage and/or a current in the first circuit, the switch network and the variable matching circuit. The wireless power transmitter may also sense the power coupling linkage by measuring a phase angle between the voltage and current in the first circuit, the switch network and the variable matching circuit. The wireless power transmitter translates the measured values to the strength of field linkage via a lookup table, an algorithm, etc. Once the wireless power receiver has powered up and starts communicating, the wireless power transmitter may also ascertain the strength of field linkage via the messages from the wireless power receiver.

If the wireless power receiver is not receiving sufficient power to power up or deliver to the needs of its load, the wireless power transmitter utilizes the sensed power coupling linkage to tune its power transmission circuitry to compensate and effectively deliver the required wireless power to the wireless power receiver. In the first embodiment, the wireless power transmitter signals its voltage source to increase the input voltage provided by the voltage source to the wireless power transmitter. In the second embodiment, the wireless power transmitter reconfigures its switch network inverter topology, for example from a Class D half bridge topology to a Class E half bridge topology, to increase the power delivered to the wireless power receiver. In a third embodiment, the wireless power transmitter reconfigures its variable matching circuit to reduce the reactive impedance seen by the switch network. In a fourth embodiment, the wireless power transmitter reconfigures its first circuit to reduce the reactive impedance seen by the switch network. Reducing the reactive impedance seen by the switch network when looking into the variable matching network will increase the current in the first circuit and hence cause more power to be delivered to the wireless power receiver. In a fifth embodiment, the wireless power transmitter's control logic circuit changes the frequency and/or the duty cycle of the pulse width modulation (PWM) signal supplied to the switch network. The frequency may be set to the resonant frequency of the wireless power receiver or may be adjusted suitably to deliver more power to the wireless power receiver. At a fixed frequency, increasing the duty cycle up to 50% will also cause more power to be delivered to the wireless power receiver.

The wireless power transmitter disclosed herein is configured to sequentially parse one of multiple test conditions to identify the power transfer mode of the wireless power receiver, the wireless power protocol of the wireless power receiver, and the power coupling linkage between the wireless power transmitter and the wireless power receiver. Each of the test conditions comprises instructions to reconfigure the circuit configuration of the wireless power transmitter to transmit power in one of the power transfer modes, to tune the power transmission based on the power coupling linkage between the wireless power transmitter and the wireless power receiver, and to transmit the messages and interpret the received messages in one of the wireless power protocols.

The circuit configuration of the wireless power transmitter disclosed herein based on the instructions in one of the sequentially parsed test conditions is reconfigured, for example, by reconfiguring the first circuit to transmit the power in one of the power transfer modes, by reconfiguring the switch network, the variable matching circuit, and the control logic circuit to draw, transform, and deliver the power from the power source to the first circuit in a manner optimally suited for the power coupling linkage between the wireless power transmitter and the wireless power receiver, by reconfiguring one or more of the switch network, the variable matching circuit, the modulator/demodulator block or the out-of-band communication block, and the control logic circuit, to adhere to all aspects, for example, a wireless receiver detect routine, a power transmit frequency, a duty cycle, messages, etc., of those wireless power protocols.

The tank circuit of the variable matching circuit, the switch network, and the control logic circuit of the wireless power transmitter are configured to tune the power transmission based on the power coupling linkage between the wireless power transmitter and the wireless power receiver. The strength of the field linkage between the wireless power transmitter and the wireless power receiver may be strongly coupled, weakly coupled, critically coupled or over-coupled based on the three dimensional separation and alignment between the centers of the first circuit, size of the first circuit, etc. The wireless power transmitter tunes its power transmission to compensate for the strength of the field linkage between the wireless power transmitter and the wireless power receiver to transmit power effectively to the wireless power receiver.

The wireless power transmitter disclosed herein is configured to identify a match if one of the power transfer modes of the first circuit and one of the wireless power protocols of the switch network, the variable matching circuit, the modulator/demodulator block or the out-of-band communication block, and the control logic circuit, match the power transfer mode and the wireless power protocol of the wireless power receiver, respectively. The wireless power transmitter disclosed herein is configured to transmit the power to the wireless power receiver in one of the power transfer modes and one of the wireless power protocols of the wireless power receiver based on the identified match via the field linkage between the wireless power transmitter and the wireless power receiver.

In an embodiment, the wireless power transmitter disclosed herein is a single mode non-multi-coupling single protocol wireless power transmitter. In another embodiment, the wireless power transmitter disclosed herein is a single mode multi-coupling multi-protocol wireless power transmitter. In another embodiment, the wireless power transmitter disclosed herein is a single mode multi-coupling single protocol wireless power transmitter. In another embodiment, the wireless power transmitter disclosed herein is a single mode non-multi-coupling multi-protocol wireless power transmitter. In another embodiment, the wireless power transmitter disclosed herein is a multi-mode non-multi-coupling multi-protocol wireless power transmitter. When the wireless power transmitter is configured in a single (power transfer) mode then it supports either magnetic field power transfer mode or an electric field power transfer mode but not both. When the wireless power transmitter is configured in multi-(power transfer) mode then it supports both magnetic field power transfer mode and an electric field power transfer mode. The wireless power transmitter may be designed with or without multi-coupling capability. It may be designed to handle multiple protocols (multi-protocol) or just one protocol (single protocol).

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

FIG. 12 exemplarily illustrates another embodiment for extendably positioning the multi-mode multi-coupling multi-protocol wireless power transmitter in a portable electronic device for allowing charging of a single electronic device or for allowing simultaneous charging of multiple electronic devices disposed atop the multi-mode multi-coupling multi-protocol wireless power transmitter.

DETAILED DESCRIPTION OF THE INVENTION

Figure 1:
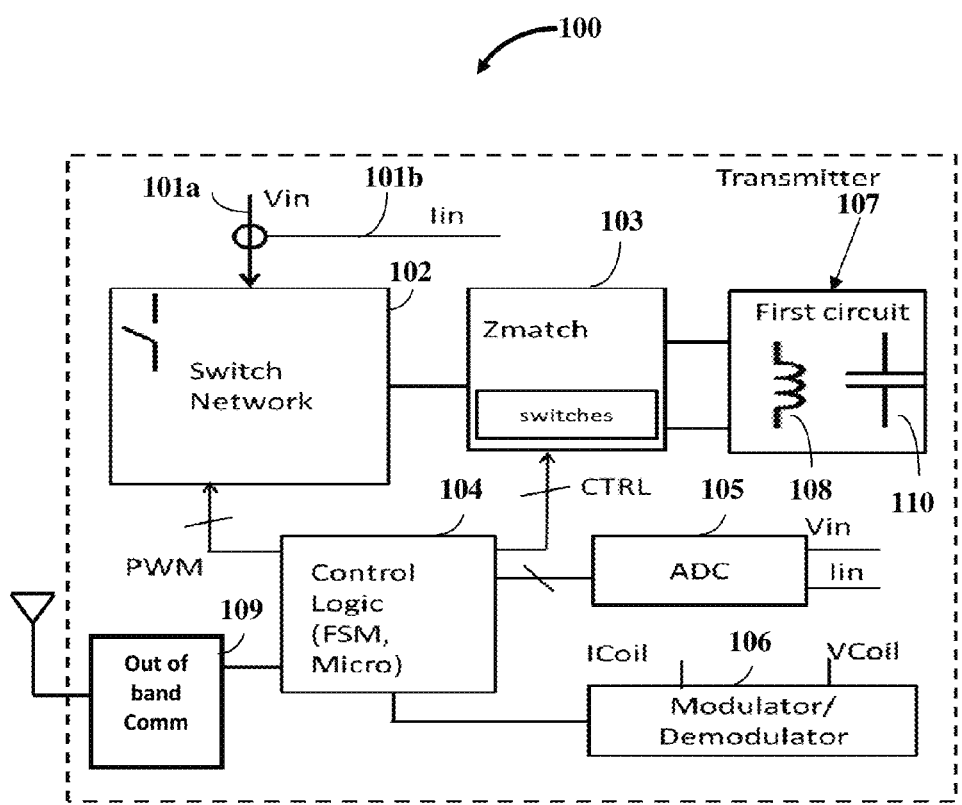
FIG. 1 exemplarily illustrates a schematic diagram of a multi-mode multi-coupling multi-protocol wireless power transmitter.

Disclosed herein is a multi-mode multi-coupling multi-protocol wireless power transmitter 100 exemplarily illustrated in FIG. 1, herein referred to as a "wireless power transmitter" that transmits power to a wireless power receiver (not shown) in a power transfer mode and a wireless power protocol matching that of the wireless power receiver. The wireless power transmitter 100 disclosed herein comprises a first circuit 107. The first circuit 107 comprises one or more inductors 108 and one or more capacitors 110. The first circuit 107 is configured to transmit power to the wireless power receiver via a magnetic field or an electric field. The magnetic field power transfer mode and the electric field power transfer mode represent the multiple power transfer modes of the wireless power transmitter 100.

Figure 2A:
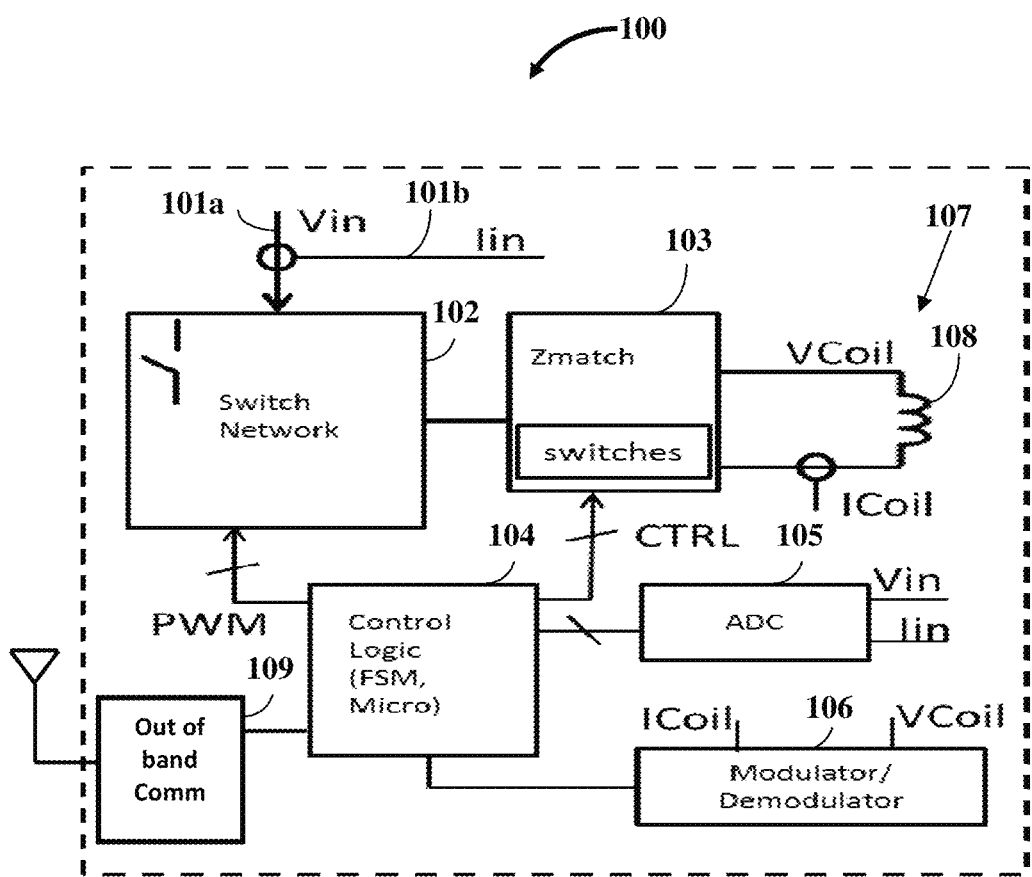
FIG. 2A exemplarily illustrates a schematic diagram of a magnetic field based multi-mode multi-coupling multi-protocol wireless power transmitter.

FIG. 2A exemplarily illustrates a schematic diagram of a multi-mode multi-coupling multi-protocol wireless power transmitter 100 configured to emanate power via a magnetic field. The first circuit's 107 one or more inductors 108 are activated to emanate power via a magnetic field. The first circuit 107 is connected to a variable matching circuit 103 of the wireless power transmitter 100. The inductors 108 of the first circuit 107 are connected in a parallel configuration or a series configuration and are individually selectable by switches 111 as exemplarily illustrated in FIG. 3. The inductors 108 in the first circuit 107 emanate power through the magnetic field. When the wireless power receiver is found to operate in a magnetic field based power transfer mode, the configuration of the first circuit 107 comprising the inductors 108 in the wireless power transmitter 100 is selected to match the power transfer mode of the wireless power receiver. The magnetic field power transfer mode represents one of the power transfer modes in which the wireless power transmitter 100 exemplarily illustrated in FIG. 1, is capable of transferring power.

Figure 2B:
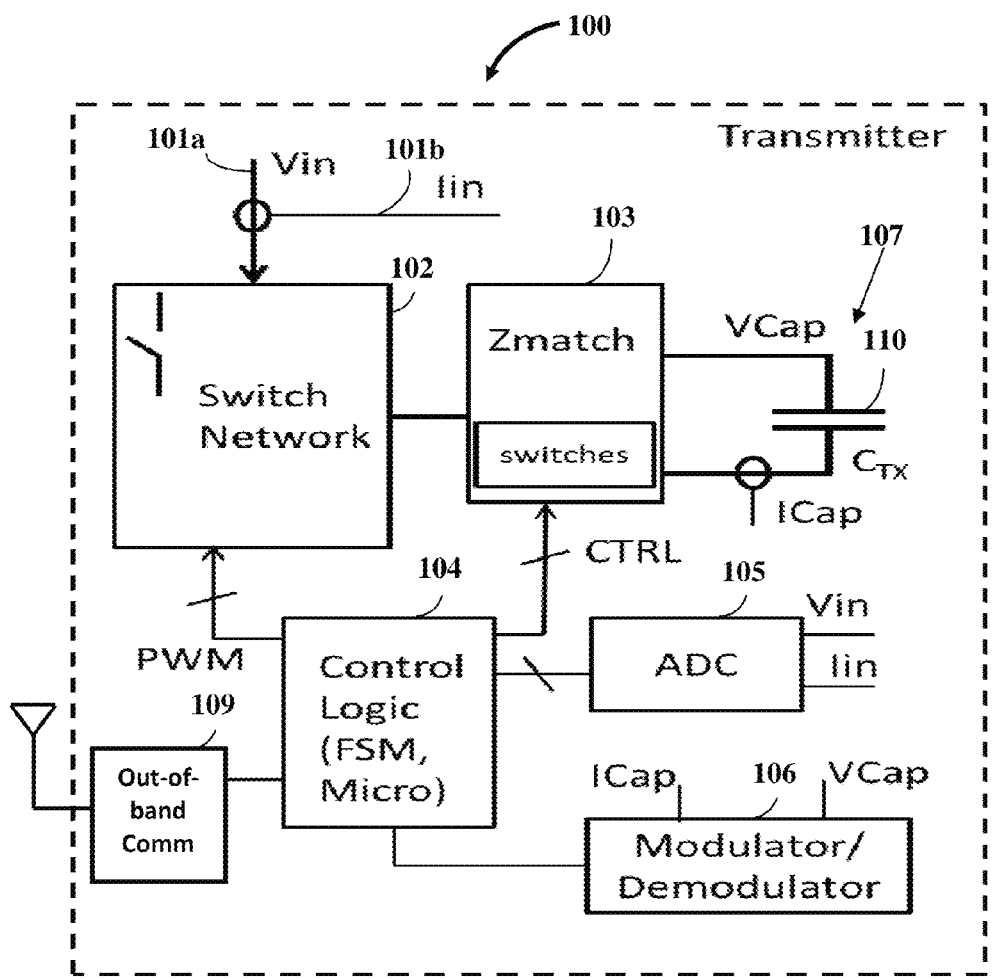
FIG. 2B exemplarily illustrates a schematic diagram of an electric field based multi-mode multi-coupling multi-protocol wireless power transmitter.

FIG. 2B exemplarily illustrates a schematic diagram of a multi-mode multi-coupling multi-protocol wireless power transmitter 100 configured to emanate power via an electric field. The first circuit's 107 one or more capacitors 110 are activated to emanate power via an electric field. The first circuit 107 is connected to the variable matching circuit 103 of the wireless power transmitter 100. The capacitors 110 of the first circuit 107 are connected in a parallel configuration or a series configuration and are individually selectable by switches. The capacitors 110 in the first circuit 107 emanate power through an electric field. When the wireless power receiver is found to operate in an electric field based power transfer mode, the configuration of the first circuit 107 comprising the one or more capacitors 110 in the wireless power transmitter 100 is selected to match the power transfer mode of the wireless power receiver. The electric field power transfer mode represents one of the power transfer modes in which the wireless power transmitter 100 exemplarily illustrated in FIG. 1, is capable of transferring power.

As exemplarily illustrated in FIG. 1, FIGS. 2A-2B, and FIG. 3, the wireless power transmitter 100 disclosed herein comprises a switch network 102 configured to receive an input voltage 101$a$ from a voltage source and an input current 101$b$. The switch network 102 comprises transistors that are configured to change a state, for example, into an on state or an off state, based on the pulse width modulation (PWM) signal received by the switch network 102. The wireless power transmitter 100 further comprises a variable matching circuit 103 represented as a Zmatch block connected between the switch network 102 and the first circuit 107. The variable matching circuit 103 comprises a tank circuit. The tank circuit of the variable matching circuit 103 comprises one or more of passive electronic components, for example, a resistor, a capacitor, a magnetic device, a transducer, etc.; active electronic components, for example, a diode, a transistor such as a metal oxide semiconductor field effect transistor (MOSFET), a bipolar transistor, etc., operational amplifiers, an optoelectronic device, etc.; and electronic switches.

The wireless power transmitter 100 disclosed herein further comprises a modulator/demodulator block 106 configured to transmit and receive messages to and from the wireless power receiver in one of multiple wireless power protocols. The wireless power receiver communicates in one of multiple wireless power protocols. The wireless power transmitter 100 disclosed herein further comprises a control logic circuit 104 configured to identify the wireless power protocol of the wireless power receiver. The wireless power transmitter 100 disclosed herein further comprises an out-of-band communication block 109 operably coupled to the control logic circuit 104. The out-of-band communication block 109 is also configured to transmit and receive messages to and from the wireless power receiver. The out-of-band communication block 109 can be used by the wireless power transmitter 100 as an alternate to the modulator/demodulator block 106 for transmitting and receiving messages to and from the wireless power receiver. The control logic circuit 104 is configured to provide a pulse width modulation (PWM) signal to the switch network 102 to operate the switch network 102 in a frequency regime and/or a duty cycle regime. Analog input signals are converted to digital signals by an analog to digital converter (ADC) 105 operably coupled to the control logic circuit 104 of the wireless power transmitter 100. The output signal of the ADC 105 is fed to the control logic circuit 104. The control logic circuit 104 enables or disables electronic components in the variable matching circuit 103 using general purpose input/outputs (GPIOs) and switches.

As used herein, the term "power coupling linkage" refers to the strength of a field linkage, for example, a magnetic flux field linkage or an electrostatic field linkage between the wireless power receiver and the wireless power transmitter 100. The power coupling linkage is a conduit for transfer of wireless power from the wireless power transmitter 100 to the wireless power receiver. Based on factors such as vertical separation, alignment, physical dimensions, etc., the strength of the field linkage between the wireless power transmitter 100 and the wireless power receiver may be strongly coupled, weakly coupled, critically coupled, or over-coupled. The wireless power transmitter 100 disclosed herein senses the power coupling linkage between the wireless power transmitter 100 and the wireless power receiver. If the wireless power receiver is not receiving sufficient power to power up or deliver to the needs of its load, the wireless power transmitter 100 utilizes the sensed power coupling linkage to reconfigure its circuitry to compensate and effectively deliver the required wireless power to the wireless power receiver. For example, when the wireless power receiver is first placed on the wireless power transmitter 100, the power coupling linkage between them may not be strong enough and the wireless power receiver may not be receiving sufficient power to power up. In such a case, a "multi-coupling" wireless power transmitter 100 would sense the level of coupling and tune its power transmission circuitry to transmit higher power than previously so as to power up the wireless power receiver. This capability of the wireless power transmitter 100 to adapt to varied strengths of field linkages between the wireless power transmitter 100 and the wireless power receiver is referred herein as "multi-coupling". A wireless power transmitter that lacks such a capability is referred herein as "non-multi-coupling". A non-multi-coupling wireless power transmitter does not adapt itself so when the power coupling linkage is below the designed limit, the wireless power receiver will not receive sufficient power to power up or if its powered up, it may not be able to deliver the full requested power to its load as it is not getting the required power from the wireless power transmitter.

The wireless power transmitter 100 disclosed herein senses the power coupling linkage between the wireless power transmitter 100 and the wireless power receiver. In the first embodiment, the wireless power transmitter 100 measures a voltage, for example the peak voltage, in the first circuit 107, the switch network 102 and the variable matching circuit 103 to sense the power coupling linkage. In the second embodiment, the wireless power transmitter 100 measures a current, for example the peak current, flowing in the first circuit 107, the switch network 102 and the variable matching circuit 103 to sense the power coupling linkage. In the third embodiment, the wireless power transmitter 100 measures the phase angle between a current and a voltage in the first circuit 107, the switch network 102 and the variable matching circuit 103 to sense the power coupling linkage. For example, the wireless power transmitter 100 may measures the phase angle between the current flowing through the first circuit 107 and the voltage that is at the output of the switch network 102 and provided as the input to the variable matching circuit 103. The wireless power transmitter 100 translates the measured values to the strength of field linkage via a lookup table, an algorithm, etc. In a fourth embodiment, once the wireless power receiver has powered up and starts communicating, the wireless power transmitter 100 ascertains the strength of field linkage via the messages from the wireless power receiver.

If the wireless power receiver is not receiving sufficient power to power up or deliver to the needs of its load, the wireless power transmitter 100 utilizes the sensed power coupling linkage to tune its power transmission circuitry to compensate and effectively deliver the required wireless power to the wireless power receiver. In the first embodiment, the wireless power transmitter 100 signals its voltage source to increase the input voltage 101a provided by the voltage source to the wireless power transmitter 100. The change in voltage requested is in proportion to the sensed power coupling linkage. If the power coupling linkage is weak compared to the optimal, a higher voltage increase is requested. A higher input voltage 101a will increase the current in the first circuit 107 and hence cause more power to be delivered to the wireless power receiver. In the second embodiment, the wireless power transmitter 100 reconfigures its switch network 102, for example, reconfigures the switch network 102 from a Class D half bridge inverter topology to a Class D full bridge topology or alternately, from a Class D half bridge inverter topology to a Class E half bridge inverter topology. Changing the switch network topology as described, will also increase the current in the first circuit 107 and hence cause more power to be delivered to the wireless power receiver. In a third embodiment, the wireless power transmitter 100 reconfigures its variable matching circuit 103 to reduce the reactive impedance seen by the switch network 102. In a fourth embodiment, the wireless power transmitter 100 reconfigures its first circuit 107 to reduce the reactive impedance seen by the switch network 102. Reducing the reactive impedance seen by the switch network 102 when looking into the variable matching circuit 103 will increase the current in the first circuit 107 and hence cause more power to be delivered to the wireless power receiver. In a fifth embodiment, the wireless power transmitter's 100 control logic circuit 104 changes the frequency and/or the duty cycle of the pulse width modulation (PWM) signal that it provides to the switch network 102. The frequency may be set to the resonant frequency of the wireless power receiver or may be adjusted suitably to deliver more power to the wireless power receiver.

The wireless power transmitter 100 scans and detects the presence of a wireless power receiver in its vicinity, and triggers sequential parsing of one of multiple test conditions used by the wireless power transmitter 100 to identify a power transfer mode and a wireless power protocol of the wireless power receiver. When the wireless power receiver is first placed on the wireless power transmitter 100, the power coupling linkage between them at the default operating point of the wireless power protocol may not be strong enough. As a result, the wireless power receiver may not be receiving sufficient power to power up and communicate. Without messages from the wireless power receiver, the wireless power transmitter 100 will not be able to determine the power transfer mode and wireless power protocol of the wireless power receiver. It thus becomes essential for the wireless power transmitter 100 to sense the level of coupling and tune its power transmission circuitry to transmit higher power than previously so as to power up the wireless power receiver.

The wireless power receiver typically operates in a single wireless power mode and a single wireless power protocol, whereas the wireless power transmitter 100 operates in one of multiple modes and wireless power protocols. For a given time period, the wireless power transmitter 100 delivers minimum power in a chosen power transfer mode and as per the dictates of the selected wireless power protocol and in a manner optimized for the sensed initial power coupling linkage between the wireless power transmitter 100 and the wireless power receiver. The wireless power receiver in the vicinity that is tuned to that mode and that wireless power protocol draws sufficient power to power-up, operate and begin communicating with the wireless power transmitter 100 in compliance with that wireless power protocol. The wireless power transmitter 100 detects the drawing of power and parses messages if any received from the wireless power receiver. If the wireless power receiver does not draw power or if the messages are not compliant with that wireless power protocol, the wireless power transmitter 100 ends transmission of power. Then, for the next time period, the wireless power transmitter 100 reconfigures its circuitry to operate in the next power transfer mode and wireless power protocol as defined in the sequence of test conditions optimizing the power delivery again in line with the sensed initial power coupling linkage.

A match between the wireless power protocol of the wireless power transmitter 100 and the wireless power protocol of the wireless power receiver is achieved when the wireless power receiver draws power and communicates in compliance with the wireless power protocol. A wireless power protocol defines, for example, the operating frequency range, duty cycle range, message or symbol format and semantics, safety measures, etc. These definitions are contained and implemented in the control logic circuit 104. Signal processing to recover communication data received from the wireless power receiver also varies among the wireless power protocols and the specifics employed by the wireless power transmitter 100 are contained in the modulator/demodulator block 106 and the out-of-band communication block 109 of the wireless power transmitter 100.

The wireless power transmitter 100 is configured to sequentially parse one of multiple test conditions to identify the power transfer mode of the wireless power receiver and the wireless power protocol of the wireless power receiver. Each of the test conditions comprises instructions to reconfigure the circuit configuration of the wireless power transmitter 100 to transmit power in one of the power transfer modes, to tune the power transmission based on the power coupling linkage between the wireless power transmitter 100 and the wireless power receiver in a specific manner, and to transmit the messages and interpret the received messages in one of the wireless power protocols.

Figure 3:
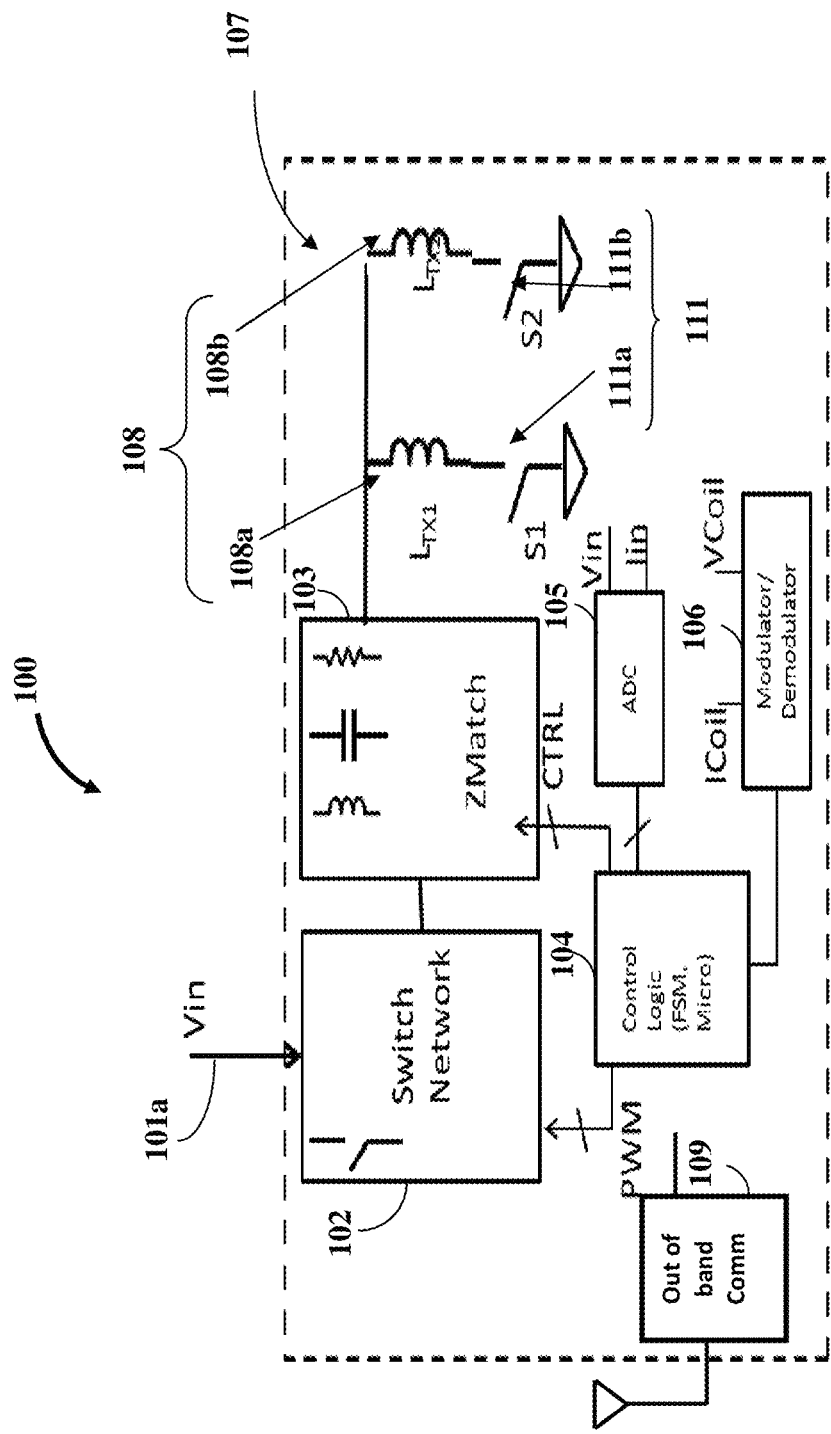
FIG. 3 exemplarily illustrates a schematic diagram of a magnetic field based multi-mode multi-coupling multi-protocol wireless power transmitter that emanates wireless power through a magnetic field.

The circuit configuration of the wireless power transmitter 100 based on the instructions in one of the sequentially parsed test conditions is reconfigured, for example, by reconfiguring the first circuit 107 to transmit the power in one of the power transfer modes by selecting one or more inductors 108 as exemplarily illustrated in FIG. 1 and FIG. 3, by reconfiguring one or more of the switch network 102, the variable matching circuit 103, and the control logic circuit 104 to draw, transform, and deliver the power from the power source to the first circuit 107 in a manner optimally suited for the power coupling linkage between the wireless power transmitter 100 and the wireless power receiver, by reconfiguring one or more of the switch network 102, the variable matching circuit 103, the modulator/demodulator block 106 or the out-of-band communication block 109, and the control logic circuit 104, to adhere to all aspects, for example, a wireless receiver detect routine, a power transmit frequency, a duty cycle, messages, etc., of those wireless power protocols.

The wireless power transmitter 100 is configured to identify a match if one of the power transfer modes of the first circuit 107 and one of the wireless power protocols of the switch network 102, the variable matching circuit 103, the modulator/demodulator block 106 or the out-of-band communication block 109, and the control logic circuit 104 match the power transfer mode and the wireless power protocol of the wireless power receiver respectively. The wireless power transmitter 100 is configured to transmit the power to the wireless power receiver in one of the power transfer modes and one of the wireless power protocols of the wireless power receiver based on the identified match, via the power coupling linkage between the wireless power transmitter 100 and the wireless power receiver.

FIG. 3 shows the wireless power transmitter 100 that uses a magnetic field power transfer mode as a means for providing wireless power and also shows how the multi-protocol support is achieved. In the magnetic field based wireless power transfer mode, an important component of the wireless power transmitter 100 is the inductance of the inductor 108 also referred to as a primary coil. The primary coil inductance in conjunction with the tank circuit of the variable matching circuit 103 represented as a Zmatch block in FIG. 3, determines the resonance frequency of the wireless power transmitter topology. Other wireless power protocol specific information, for example, an operating frequency range, a duty cycle range, a message or symbol format and semantics, safety measures, etc., is contained in the control logic circuit 104 of the wireless power transmitter 100. Signal processing is carried out to recover communication data of the wireless power receiver. The recovery process varies and the specifics of the wireless power protocols are contained in the modulator/demodulator block 106 and the out-of-band communication block 109 of the wireless power transmitter 100.

Consider an example where an input signal is converted to a digital signal by an analog to digital converter (ADC) 105, where the ADC 105 is operably coupled to the control logic circuit 104 of the wireless power transmitter 100. The output signal of the ADC 105 is fed to the control logic circuit 104. The control logic circuit 104 in turn outputs a pulse width modulation (PWM) signal based on a signal sent by a demodulator of the modulator/demodulator block 106 to the switch network 102. Also, the control logic circuit 104 sends another PWM signal to a modulator in the modulator/demodulator block 106 for a communication link that exists from the wireless power transmitter 100 to wireless power receiver. The control logic circuit 104 enables or disables electronic components in the variable matching circuit 103 using general purpose input/outputs (GPIOs) and switches. The switch network 102 comprises transistors that are configured to change a state, for example, into an on state or an off state, based on the PWM signal supplied to the switch network 102.

As exemplarily illustrated in FIG. 3, the wireless power transmitter 100 shows how a different inductance is selected for different wireless power protocols using one or more electronic switches 111, for example, switch S1 111a and switch S2 111b. For example, a wireless power protocol A may use an inductor coil Ltx1 108a, a wireless power protocol B may use an inductor coil Ltx2 108b, and a wireless power protocol C may use both the inductance coils Ltx1 108a and Ltx2 108b parallel to each other. A similar arrangement can be extended to "N" inductors coils 108 with "N" switches 111.

In an embodiment, the wireless power transmitter 100 scans the environment for a wireless power receiver. At the outset, the wireless power transmitter 100 is not aware of the power transfer mode and the wireless power protocol contained in the wireless power receiver, and therefore sequences through the power transfer modes and the wireless power protocols by conducting specific tests one at a time. For example, if the wireless power transmitter 100 is configured to support two modes, for example, a mode A with an inductor configuration for emanating a magnetic field and a mode B with a capacitor configuration for emanating an electric field, and two wireless power protocols for mode A, for example, A1 and A2, and two other wireless power protocols for mode B, for example, B1 and B2, then when the wireless power transmitter 100 is turned on, the wireless power transmitter 100 provides a small amount of power in mode A and mode B, one at a time, alternating between them. If there is a wireless power receiver in the vicinity, then it will draw power in its designed mode. If the wireless power receiver draws power in mode A, for example, then to begin with, the wireless power transmitter 100 provides initial power in a manner that is compliant with protocol A1. Depending on the power coupling linkage, the initial A1 default operating point may not provide sufficient power to the wireless power receiver for the wireless power receiver to power up. Then, the wireless power transmitter 100 tunes its circuitry based on the sensed power coupling linkage to increase its power output. On receiving sufficient power, the wireless power receiver powers up and starts communicating in its designed protocol. If the wireless power receiver's communication is compliant with A1 protocol, then a match of mode and protocol has been achieved. If the wireless power receiver's communication is not compliant with A1 protocol, then the wireless power transmitter 100 ends the power transmission and after a brief delay for letting the circuitry settled down, repeats the above procedure with A2 protocol. If the wireless power receiver's communication is not compliant with A2 protocol too, then the wireless power transmitter 100 steps back to test power draw on mode A and mode B as it did when the wireless power transmitter 100 was initially powered on. For each of these modes and wireless power protocol combinations, the wireless power transmitter 100 tunes the protocol specific parameters such as operating frequency, duty cycle, message or symbol format and semantics, etc., as appropriate for that mode and wireless power protocol combination. It is quite possible that the object in the vicinity of the wireless power transmitter 100 is a metal object and not a true wireless power receiver. In such a case, the metal object would draw power but not communicate. Based on the sensed power coupling linkage, the wireless power transmitter 100 may provide more power but since the metal object will never communicate, the wireless power transmitter 100 will recognize and flag the metal object via turning on a light emitting diode (LED), etc.

With multi-mode support in the wireless power transmitter 100, for example, an inductive mode and a capacitive mode, and the associated support circuitry, for example, the switch network 102, the variable matching circuit 103, the control logic circuit 104, ADC block 105, the modulator/demodulator block 106, and the out-of-band communication block 109 supporting multi-coupling and one or more wireless power protocols, the wireless power transmitter 100 can effectively and scalably transfer power to a wide array of wireless power receivers that are built with different power transfer modes, different power needs and different wireless power protocols. The multi-mode multi-coupling multi-protocol wireless power transmitter 100 provides great convenience for consumers to charge their mobile devices such as their cameras, Bluetooth headsets, game controllers, mobile phones, tablets, notebooks etc., all from the same wireless power transmitter 100. The multi-mode multi-coupling multi-protocol wireless power transmitter 100 provides great flexibility for consumers to own and enjoy mobile devices that have different wireless power technologies integrated or externally attached to the mobile device.

In an embodiment, the wireless power transmitter is a single mode non-multi-coupling single protocol wireless power transmitter 800 as exemplarily illustrated in FIGS. 8-11. The wireless power transmitter's 800 first circuit 107 supports only one power transfer mode, either a magnetic field based power transfer mode or an electric field based power transfer mode. The wireless power transmitter 800 is not designed to reconfigure its circuitry to adapt to the varied power coupling linkages between the wireless power transmitter 800 and the wireless power receiver. The wireless power transmitter's 800 circuitry also supports only one wireless power protocol.

In an embodiment, the wireless power transmitter 100 is a single mode multi-coupling multi-protocol wireless power transmitter. The wireless power transmitter's 100 first circuit 107 supports only one power transfer mode, either a magnetic field based power transfer mode or an electric field based power transfer mode. The wireless power transmitter 100 reconfigures its circuitry as needed to adapt to the power coupling linkage between the wireless power transmitter 100 and the wireless power receiver. The wireless power transmitter's 100 circuitry supports multiple wireless power protocol.

In an embodiment, the wireless power transmitter 100 is a single mode multi-coupling single protocol wireless power transmitter. The wireless power transmitter's 100 first circuit 107 supports only one power transfer mode, either a magnetic field based power transfer mode or an electric field based power transfer mode. The wireless power transmitter 100 reconfigures its circuitry as needed to adapt to the power coupling linkage between the wireless power transmitter 100 and the wireless power receiver. The wireless power transmitter's 100 circuitry supports only one wireless power protocol.

In an embodiment, the wireless power transmitter is a single mode non-multi-coupling multi-protocol wireless power transmitter. The wireless power transmitter's first circuit 107 supports only one power transfer mode, either a magnetic field based power transfer mode or an electric field based power transfer mode. The wireless power transmitter is not designed to reconfigure its circuitry to adapt to the varied power coupling linkages between the wireless power transmitter and the wireless power receiver. The wireless power transmitter's circuitry supports multiple wireless power protocol.

In an embodiment, the wireless power transmitter 100 is a multi-mode non-multi-coupling multi-protocol wireless power transmitter. The wireless power transmitter's first circuit 107 supports only multiple power transfer modes, both a magnetic field based power transfer mode and an electric field based power transfer mode. The wireless power transmitter is not designed to reconfigure its circuitry to adapt to the varied power coupling linkages between the wireless power transmitter and the wireless power receiver. The wireless power transmitter's circuitry supports multiple wireless power protocol.

Figure 4:
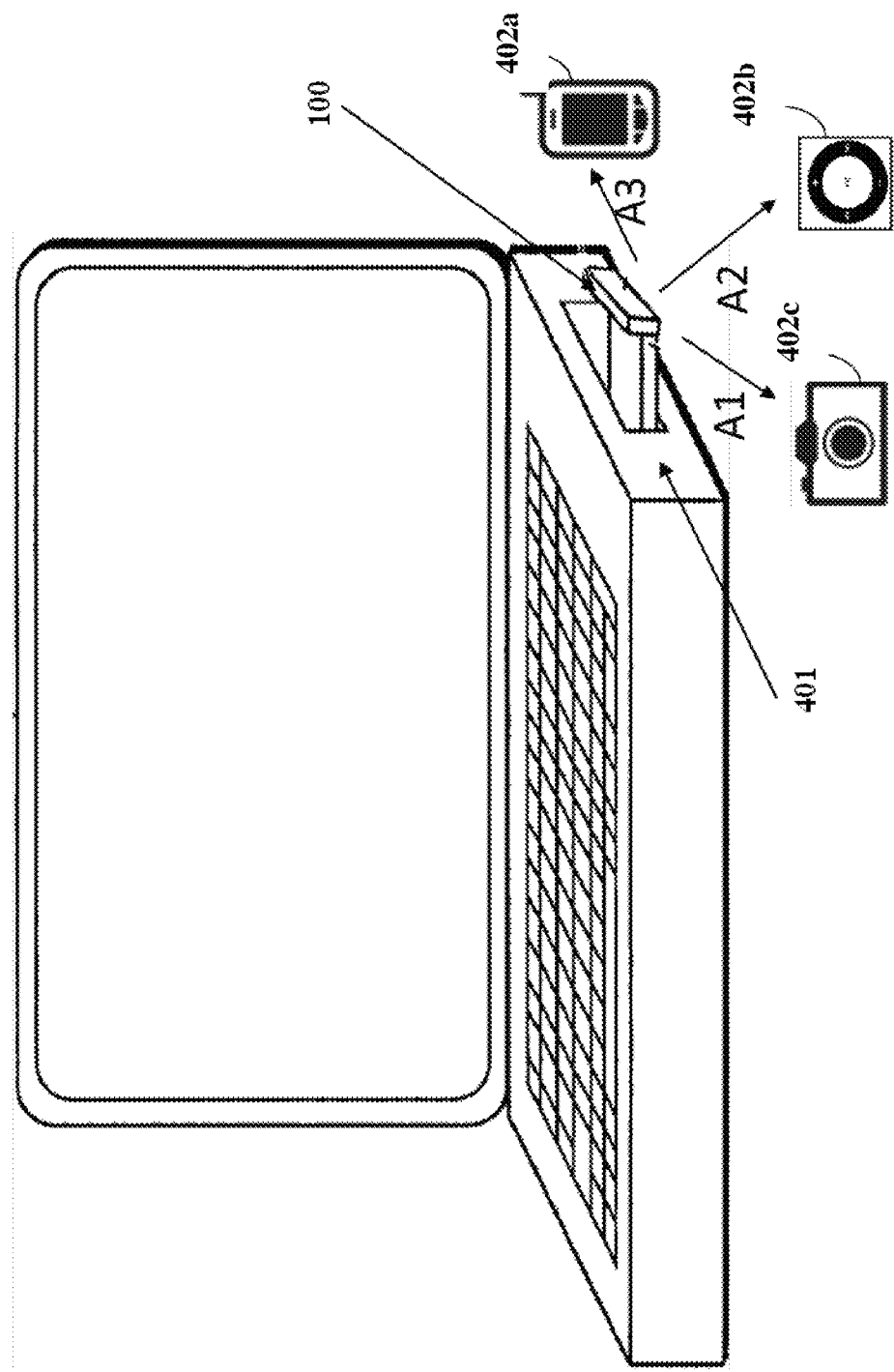
FIG. 4 exemplarily illustrates an embodiment for extendably positioning the multi-mode multi-coupling multi-protocol wireless power transmitter in a portable electronic device for allowing charging of a single electronic device or for allowing simultaneous charging of multiple electronic devices disposed near and around the multi-mode multi-coupling multi-protocol wireless power transmitter.

FIG. 4 exemplarily illustrates an embodiment for extendably positioning the multi-mode multi-coupling multi-protocol wireless power transmitter 100 in a portable electronic device 401 for allowing charging, for example, of a single electronic device 402a, 402b, or 402c, or for allowing simultaneous charging, for example, of multiple electronic devices 402a, 402b, and 402c disposed near and around the multi-mode multi-coupling multi-protocol wireless power transmitter 100. The wireless power transmitter 100 is extendably positioned as a plug-in or a pullout in a portable electronic device 401 such as a laptop as exemplarily illustrated in FIG. 4, or a non-portable electronic device, for transmitting wireless power to one wireless power receiver or for simultaneously transmitting wireless power to multiple wireless power receivers integrated in different electronic devices, for example, a mobile phone 402a, a music player 402b, a camera 402c, etc., in its vicinity.

The wireless power transmitter 100 disclosed herein can be housed in portable electronic devices, for example, laptops, an Ultrabook™ of Intel Corporation, tablet computing devices, gaming consoles, etc., as well as in non-portable electronic devices, for example, Blu-ray® players of Blu-ray Disc Association, digital versatile disc (DVD) players, set top boxes, printers, other audio and/or video processing instruments such as speakers, desktop personal computers (PCs), televisions (TVs), liquid crystal display (LCD) monitors, etc. The electronic devices, for example, 402a, 402b, and 402c integrated with the wireless power receivers may be positioned at multiple locations near and around the wireless power transmitter 100. The wireless power transmitter 100 is configured to be flexibly withdrawn from or plugged into the portable electronic device 401 or the non-portable electronic device.

The wireless power transmitter 100 can be located at different parts of the portable and non-portable electronic devices and can be flexibly withdrawn, for example, rolled out, popped out, slid out, swiveled out, folded out, etc., of the portable and non-portable electronic devices. As exemplarily illustrated in FIG. 4, the wireless power transmitter 100 is integrated into a main body extension, for example, a disc tray or a mechanical structure that can be ejected out, rolled out, popped out, slid out, swiveled out, folded out, etc., of the portable electronic device 401. In an embodiment, the wireless power transmitter 100 is also embedded into peripheral card devices, for example, a personal computer memory card international association (PCMCIA) card, an ExpressCard® of the USB Implementers Forum, Inc., or a universal serial bus (USB) flash memory card, or plug-in devices that plug into the main body of the portable electronic device 401 or the non-portable electronic device.

The topology and operation of the wireless power transmitter 100 is such that effective transfer of power is achieved when a wireless power receiver is placed near and around the main body extension or plug-in of the portable electronic device 401 or the non-portable electronic device. The weight and dimensions of the portable and non-portable electronic devices, in which the wireless power receivers are contained, are more amenable to the arrangement of having the portable and non-portable electronic devices in the near vicinity of the wireless power transmitter 100. In an example, repeated placement of a heavy electronic device, for example, a camera 402c placed on top of the main body extension or plug-in in which the wireless power transmitter 100 is contained may cause physical or electrical damage to the main body extension or the plug-in that is housing the wireless power transmitter 100 or the main body itself of the portable and non-portable electronic devices. If the dimensions of an electronic device, for example, a tablet computing device, positioned on top of the main body extension in which the wireless power transmitter 100 is contained, are large, the tablet computing device that houses the wireless power receiver will be unstable and vibrations and even minor disturbances may cause the tablet computing device to fall and suffer potential damage.

Having the wireless power receiver near and around the main body extension or plug-in or pullout in which the wireless power transmitter 100 is integrated avoids unstable placements and prevents damage to the wireless power transmitter 100 and the wireless power receiver. By extending the wireless power transmitter 100 from the main body of the portable electronic device 401, multiple electronic devices, for example, 402a, 402b, and 402c may be disposed around the exposed sides of the wireless power transmitter 100 as exemplarily illustrated in FIG. 4. As a result, the wireless power transmitter 100 having the wireless power receiver near and around the main body extension or plug-in or pullout enables simultaneous charging and effective wireless power transfer to the wireless power receiver. Effective power transfer is possible only when there is sufficient magnetic flux or electrostatic flux coupling between the wireless power transmitter 100 and the wireless power receiver. In addition to sufficient power coupling, the wireless power transmitter 100 disclosed herein is stable and reliable, thereby allowing a single wireless power transmitter 100 to simultaneously charge multiple wireless power receivers. According to the method disclosed herein, in addition to the multi-mode multi-coupling multi-protocol wireless power transmitter 100 disclosed herein, any wireless power transmitter, for example, 800 exemplarily illustrated in FIG. 8, may also be extendably positioned within a portable electronic device 401 or a non-portable electronic device for allowing charging of one electronic device, for example, 402a, 402b, or 402c or for allowing simultaneous charging of multiple electronic devices, for example, 402a, 402b, and 402c disposed near and around the wireless power transmitter 800.

FIG. 4 illustrates an example where the wireless power transmitter 100 disclosed herein is configured to support a mode A with an inductor configuration for emanating a magnetic field and for example, three wireless power protocols A1, A2, and A3. When the wireless power transmitter 100 is turned on, the wireless power transmitter 100 first scans for a wireless power receiver that draws power via mode A and is compliant with the wireless power protocol A1. As the camera 402c in the vicinity of the wireless power transmitter 100 houses a wireless power receiver that operates with the wireless power protocol A1, the wireless power transmitter 100 identifies a match of the wireless power protocol A1 and transmits power to the wireless power receiver in the camera 402c in mode A and the wireless power protocol A1 after reconfiguring its circuitry as needed to adapt to the power coupling linkage between the wireless power transmitter 100 and the camera 402c.

The wireless power transmitter 100 then sequentially scans for a wireless power receiver that is compliant with the wireless power protocol A2. As the music player 402b in the vicinity of the wireless power transmitter 100 houses a wireless power receiver that operates with the wireless power protocol A2, the wireless power transmitter 100 identifies a match of the wireless power protocol A2 and transmits power to the wireless power receiver in the music player 402b in mode A and the wireless power protocol A2 after reconfiguring its circuitry as needed to adapt to the power coupling linkage between it and the music player 402b. The wireless power transmitter 100 then sequentially scans for a wireless power receiver that is compliant with the wireless power protocol A3. As the mobile phone 402a in the vicinity of the wireless power transmitter 100 houses a wireless power receiver that operates with the wireless power protocol A3, the wireless power transmitter 100 identifies a match of the wireless power protocol A3 and transmits power to the wireless power receiver in the mobile phone 402a in mode A and the wireless power protocol A3 after reconfiguring its circuitry as needed to adapt to the power coupling linkage between the wireless power transmitter 100 and the mobile phone 402a.

Figure 5:
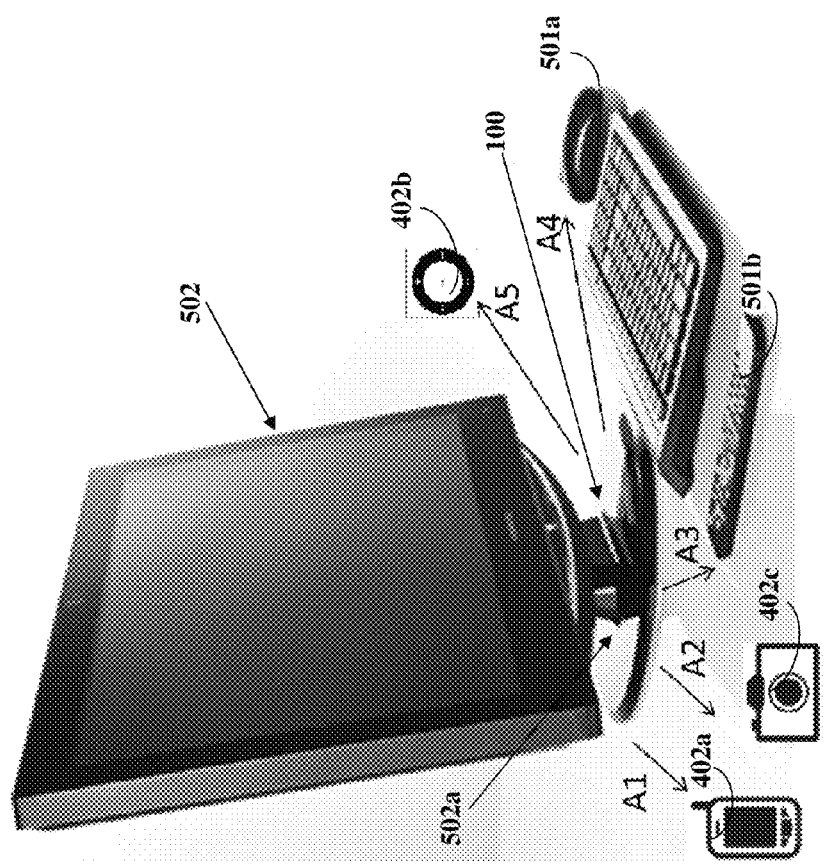
FIG. 5 exemplarily illustrates another embodiment, showing the wireless power transmitter integrated in a non-portable electronic device for allowing charging of a single electronic device or for allowing simultaneous charging of multiple electronic devices disposed near and around the multi-mode multi-coupling multi-protocol wireless power transmitter.

FIG. 5 exemplarily illustrates another embodiment, showing the wireless power transmitter 100 integrated in a non-portable electronic device 502 for allowing charging of a single electronic device, for example, 402a, 402b, 402c, 501a, or 501b, or for allowing simultaneous charging of multiple electronic devices, for example, 402a, 402b, 402c, 501a, and 501b disposed near and around the multi-mode multi-coupling multi-protocol wireless power transmitter 100. The wireless power transmitter 100 is embedded in a pedestal 502a, for example, a base or a stand of a non-portable electronic device 502, for example, an "All-In-One" desktop for charging of a single electronic device, for example, 402a, 402b, 402c, 501a, or 501b or for simultaneous charging of multiple electronic devices, for example, 402a, 402b, 402c, 501a, and 501b disposed near and around the multi-mode multi-coupling multi-protocol wireless power transmitter 100.

Consider an example where the wireless power transmitter 100 disclosed herein is configured to support a power transfer mode A with an inductor configuration for emanating a magnetic field and for example, five wireless power protocols for mode A, namely A1, A2, A3, A4, and A5. When the wireless power transmitter 100 is turned on, the wireless power transmitter 100 first scans for a wireless power receiver that draws power via mode A and is compliant with the wireless power protocol A1. As a mobile phone 402a, in the vicinity of the wireless power transmitter 100, houses a wireless power receiver that operates with the wireless power protocol A1, the wireless power transmitter 100 identifies a match of the wireless power protocol A1 and transmits power to the wireless power receiver in the mobile phone 402a in power transfer mode A and the wireless power protocol A1 after reconfiguring its circuitry as needed to adapt to the power coupling linkage between the wireless power transmitter 100 and the mobile phone 402a. The wireless power transmitter 100 then sequentially scans for a wireless power receiver that is compliant with the wireless power protocol A2. As a camera 402c, in the vicinity of the wireless power transmitter 100, houses a wireless power receiver that operates with the wireless power protocol A2, the wireless power transmitter 100 identifies a match of the wireless power protocol A2 and transmits power to the wireless power receiver in the camera 402c in mode A and the wireless power protocol A2 after reconfiguring its circuitry as needed to adapt to the power coupling linkage between the wireless power transmitter 100 and the camera 402c. The wireless power transmitter 100 then sequentially scans for a wireless power receiver that is compliant with the wireless power protocol A3. As a remote control device 501b, in the vicinity of the wireless power transmitter 100, houses a wireless power receiver that operates with the wireless power protocol A3, the wireless power transmitter 100 identifies a match of the wireless power protocol A3 and transmits power to the wireless power receiver in the remote control device 501b in mode A and the wireless power protocol A3 after reconfiguring its circuitry as needed to adapt to the power coupling linkage between the wireless power transmitter 100 and the remote control device 501b.

The wireless power transmitter 100 then sequentially scans for a wireless power receiver that is compliant with the wireless power protocol A4. As a computer mouse 501a, in the vicinity of the wireless power transmitter 100, houses a wireless power receiver that operates with the wireless power protocol A4, the wireless power transmitter 100 identifies a match of the wireless power protocol A4 and transmits power to the wireless power receiver in the computer mouse 501a in mode A and the wireless power protocol A4 after reconfiguring its circuitry as needed to adapt to the power coupling linkage between the wireless power transmitter 100 and the computer mouse 501a. The wireless power transmitter 100 then sequentially scans for a wireless power receiver that is compliant with the wireless power protocol A5. As a music player 402b, in the vicinity of the wireless power transmitter 100, houses a wireless power receiver that operates with the wireless power protocol A5, the wireless power transmitter 100 identifies a match of the wireless power protocol A5 and transmits power to the wireless power receiver in the music player 402b in mode A and the wireless power protocol A5 after reconfiguring its circuitry as needed to adapt to the power coupling linkage between the wireless power transmitter 100 and the music player 402b.

Figure 6:
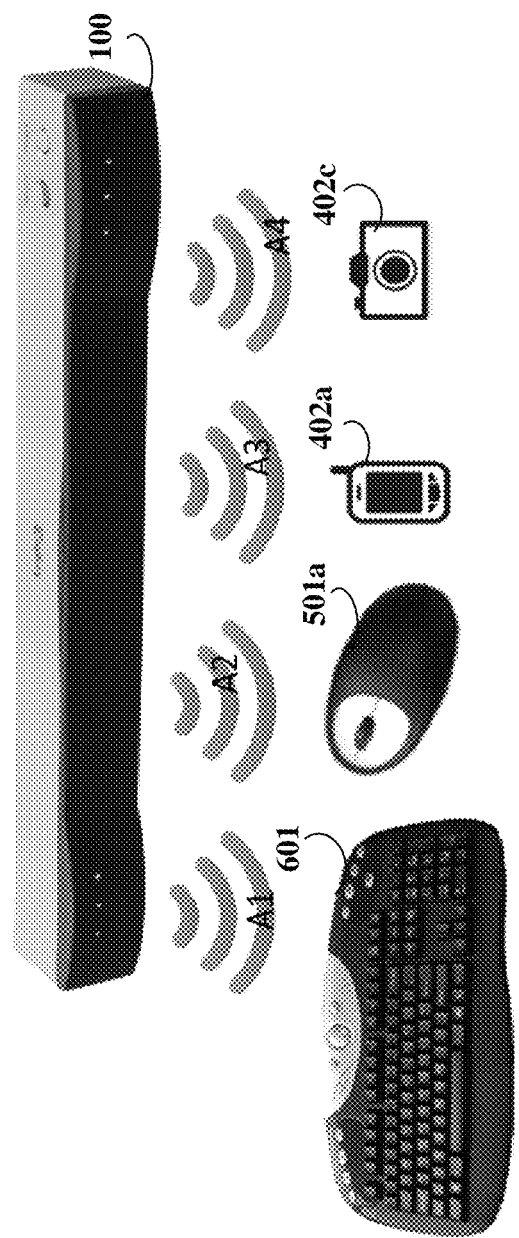
FIG. 6 exemplarily illustrates another embodiment, showing the wireless power transmitter configured as a standalone wireless device that draws power from a wall wart for allowing charging of a single electronic device or for allowing simultaneous charging of multiple electronic devices disposed near and around the multi-mode multi-coupling multi-protocol wireless power transmitter.

FIG. 6 exemplarily illustrates another embodiment, showing the wireless power transmitter 100 configured as a standalone wireless device that draws power from a wall wart for allowing charging of a single electronic device, for example, 402a, 402c, 501a, or 601, or for allowing simultaneous charging of multiple electronic devices, for example, 402a, 402c, 501a, and 601 disposed near and around the multi-mode multi-coupling multi-protocol wireless power transmitter 100. Consider an example where the wireless power transmitter 100 disclosed herein is configured to support a mode A with an inductor configuration for emanating a magnetic field and for example, four wireless power protocols for mode A, namely A1, A2, A3, and A4. When the wireless power transmitter 100 is turned on, the wireless power transmitter 100 first scans for a wireless power receiver that draws power via mode A and is compliant with the wireless power protocol A1. As a computer keyboard 601, in the vicinity of the wireless power transmitter 100, houses a wireless power receiver that operates with the wireless power protocol A1, the wireless power transmitter 100 identifies a match of the wireless power protocol A1 and transmits power to the wireless power receiver in the computer keyboard 601 in mode A and the wireless power protocol A1 after reconfiguring its circuitry as needed to adapt to the power coupling linkage between the wireless power transmitter 100 and the computer keyboard 601. The wireless power transmitter 100 then sequentially scans for a wireless power receiver that is compliant with the wireless power protocol A2. As a computer mouse 501a, in the vicinity of the wireless power transmitter 100, houses a wireless power receiver that operates with the wireless power protocol A2, the wireless power transmitter 100 identifies a match of the wireless power protocol A2 and transmits power to the wireless power receiver in the computer mouse 501a in mode A and the wireless power protocol A2 after reconfiguring its circuitry as needed to adapt to the power coupling linkage between the wireless power transmitter 100 and the computer mouse 501a.

The wireless power transmitter 100 then sequentially scans for a wireless power receiver that is compliant with the wireless power protocol A3. As the mobile phone 402a, in the vicinity of the wireless power transmitter 100, houses a wireless power receiver that operates with the wireless power protocol A3, the wireless power transmitter 100 identifies a match of the wireless power protocol A3 and transmits power to the wireless power receiver in the mobile phone 402a in mode A and the wireless power protocol A3 after reconfiguring its circuitry as needed to adapt to the power coupling linkage between the wireless power transmitter 100 and the mobile phone 402a. The wireless power transmitter 100 then sequentially scans for a wireless power receiver that is compliant with the wireless power protocol A4. As a camera 402c, in the vicinity of the wireless power transmitter 100, houses a wireless power receiver that operates with the wireless power protocol A4, the wireless power transmitter 100 identifies a match of the wireless power protocol A4 and transmits power to the wireless power receiver in the camera 402c in mode A and the wireless power protocol A4 after reconfiguring its circuitry as needed to adapt to the power coupling linkage between the wireless power transmitter 100 and the camera 402c.

Figure 7:
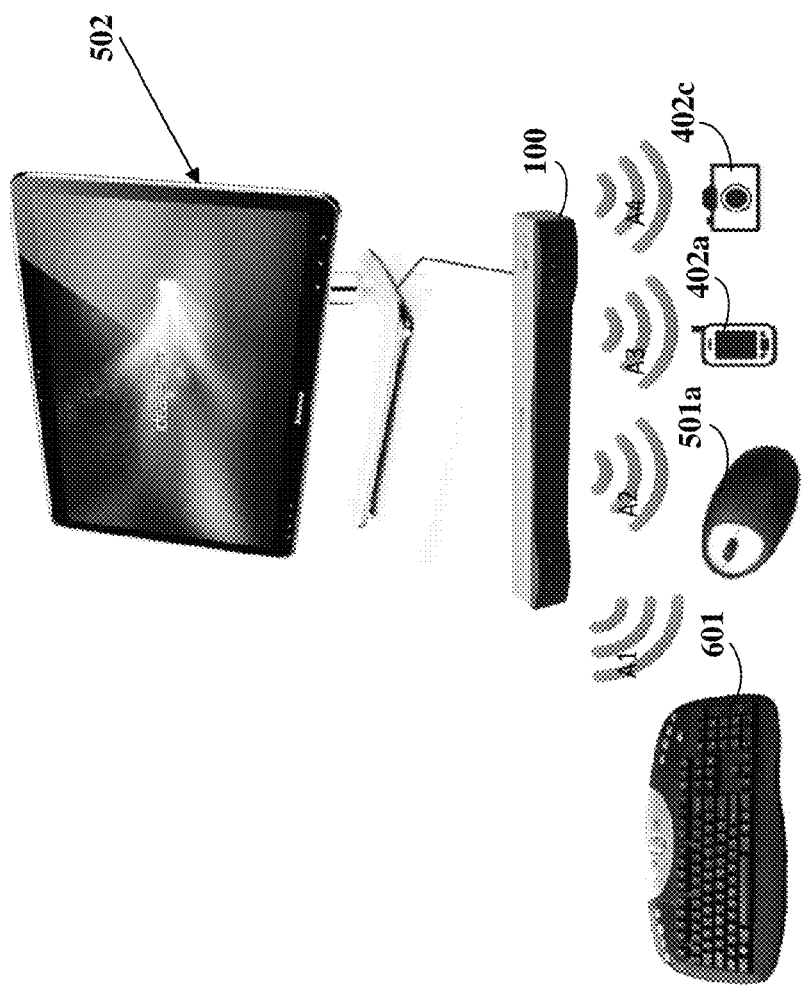
FIG. 7 exemplarily illustrates another embodiment, showing the wireless power transmitter configured as an accessory that draws power from a non-portable electronic device for allowing charging of a single electronic device or for allowing simultaneous charging of multiple electronic devices disposed near and around the multi-mode multi-coupling multi-protocol wireless power transmitter.

FIG. 7 exemplarily illustrates another embodiment, showing the wireless power transmitter 100 configured as an accessory that draws power from a non-portable electronic device 502 for allowing charging of a single electronic device, for example, 402a, 402c, 501a, or 601, or for allowing simultaneous charging of multiple electronic devices, for example, 402a, 402c, 501a, and 601 disposed near and around the multi-mode multi-coupling multi-protocol wireless power transmitter 100. The accessory may be a wireless charging bar or a wireless charging pad containing the wireless power transmitter 100. The accessory is connected to a portable electronic device or a non portable electronic device 502. Consider an example where the wireless power transmitter 100 is configured to support a mode A with an inductor configuration for emanating a magnetic field and for example, four wireless power protocols for mode A, namely A1, A2, A3, and A4. When the wireless power transmitter 100 is turned on, the wireless power transmitter 100 first scans for a wireless power receiver that draws power on mode A and is compliant with the wireless power protocol A1. As a computer keyboard 601, in the vicinity of the wireless power transmitter 100, houses a wireless power receiver that operates with the wireless power protocol A1, the wireless power transmitter 100 identifies a match of the wireless power protocol A1 and transmits power to the wireless power receiver in the computer keyboard 601 in mode A and the wireless power protocol A1 after reconfiguring its circuitry as needed to adapt to the power coupling linkage between the wireless power transmitter 100 and the computer keyboard 601.

The wireless power transmitter 100 then sequentially scans for a wireless power receiver that is compliant with the wireless power protocol A2. As a computer mouse 501a, in the vicinity of the wireless power transmitter 100, houses a wireless power receiver that operates with the wireless power protocol A2, the wireless power transmitter 100 identifies a match of the wireless power protocol A2 and transmits power to the wireless power receiver in the computer mouse 501a in mode A and the wireless power protocol A2 after reconfiguring its circuitry as needed to adapt to the power coupling linkage between the wireless power transmitter 100 and the computer mouse 501a. The wireless power transmitter 100 then sequentially scans for a wireless power receiver that is compliant with the wireless power protocol A3. As a mobile phone 402a, in the vicinity of the wireless power transmitter 100, houses a wireless power receiver that operates with the wireless power protocol A3, the wireless power transmitter 100 identifies a match of the wireless power protocol A3 and transmits power to the wireless power receiver in the mobile phone 402a in mode A and the wireless power protocol A3 after reconfiguring its circuitry as needed to adapt to the power coupling linkage between the wireless power transmitter 100 and the mobile phone 402a. The wireless power transmitter 100 then sequentially scans for a wireless power receiver that is compliant with the wireless power protocol A4. As a camera 402c, in the vicinity of the wireless power transmitter 100, houses a wireless power receiver that operates with the wireless power protocol A4, the wireless power transmitter 100 identifies a match of the wireless power protocol A4 and transmits power to the wireless power receiver in the camera 402c in mode A and the wireless power protocol A4 after reconfiguring its circuitry as needed to adapt to the power coupling linkage between the wireless power transmitter 100 and the camera 402c.

Figure 8:
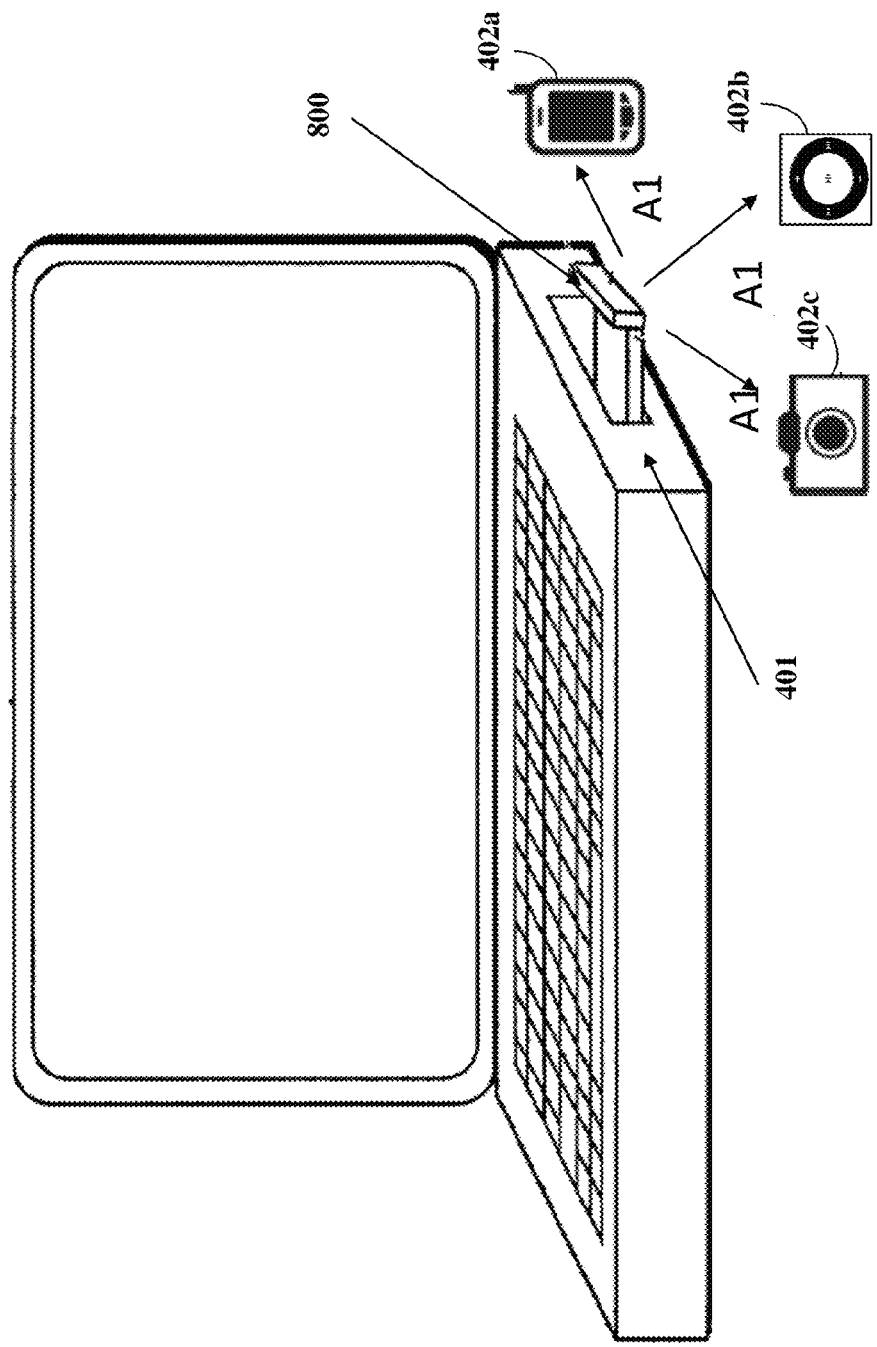
FIG. 8 exemplarily illustrates an embodiment for extendably positioning a single mode non-multi-coupling single protocol wireless power transmitter in a portable electronic device for allowing charging of a single electronic device or for allowing simultaneous charging of multiple electronic devices disposed near and around the single mode single protocol wireless power transmitter.

FIG. 8 exemplarily illustrates an embodiment for extendably positioning a single mode non-multi-coupling single protocol wireless power transmitter 800 in a portable electronic device 401 for allowing charging of a single electronic device, for example, 402a, 402b, or 402c, or for allowing simultaneous charging of multiple electronic devices, for example, 402a, 402b, and 402c disposed near and around the single mode single protocol wireless power transmitter 800. In an embodiment, the wireless power transmitter 800 disclosed herein can be flexibly withdrawn, for example, rolled out, popped out, slid out, swiveled out, folded out, etc., of a portable electronic device 401 or a non-portable electronic device. The wireless power transmitter 800 is extendably positioned as a plug-in or a pullout in a portable electronic device 401 such as a laptop as exemplarily illustrated in FIG. 8, or a non-portable electronic device, for transmitting wireless power to one wireless power receiver or for simultaneously transmitting wireless power to multiple wireless power receivers integrated in different electronic devices, for example, a mobile phone 402a, a music player 402b, a camera 402c, etc., in its vicinity.

The single mode non-multi-coupling single protocol wireless power transmitter 800 can be housed in portable electronic devices, for example, laptops, an Ultrabook™ of Intel Corporation, tablet computing devices, gaming consoles, etc., as well as in non-portable electronic devices, for example, Blu-ray® players, digital versatile disc (DVD) players, set top boxes, printers, other audio and/or video processing instruments such as speakers, desktop personal computers (PCs), televisions (TVs), liquid crystal display (LCD) monitors, etc. The electronic devices 402a, 402b, and 402c integrated with the wireless power receivers may be positioned at multiple locations near and around the wireless power transmitter 800. The wireless power transmitter 800 is configured to be flexibly withdrawn from or plugged into the portable electronic device 401 or the non-portable electronic device.

Consider an example where the wireless power transmitter 800 is configured to support a mode A with an inductor configuration for emanating a magnetic field and a single wireless power protocol A1. When the wireless power transmitter 800 is turned on, the wireless power transmitter 800 first scans for a wireless power receiver that draws power on mode A and is compliant with the wireless power protocol A1. In this example, a mobile phone 402a, a music player 402b, and a camera 402c in the vicinity of the wireless power transmitter 800, house wireless power receivers that operate with the wireless power protocol A1. The wireless power transmitter 800 identifies a match of the wireless power protocol A1 and transmits power to the wireless power receivers in the mobile phone 402a, the music player 402b, and the camera 402c in mode A and the wireless power protocol A1.

Figure 9:
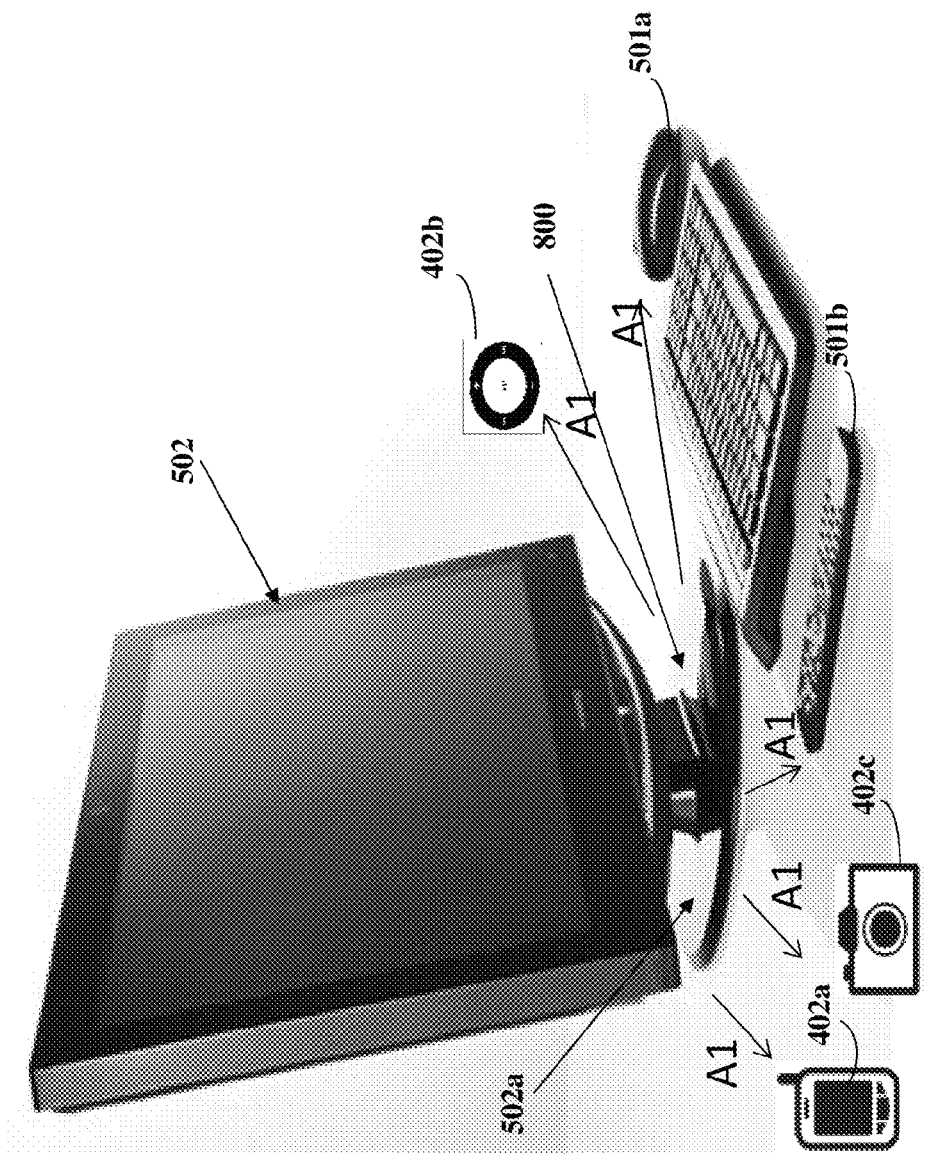
FIG. 9 exemplarily illustrates another embodiment, showing the single mode non-multi-coupling single protocol wireless power transmitter integrated in a non-portable electronic device for allowing charging of a single electronic device or for allowing simultaneous charging of multiple electronic devices disposed near and around the single mode single protocol wireless power transmitter.

FIG. 9 exemplarily illustrates another embodiment, showing the single mode non-multi-coupling single protocol wireless power transmitter 800 integrated in a non-portable electronic device 502 for allowing charging of a single electronic device, for example, 402a, 402b, 402c, 501a, or 501b, or for allowing simultaneous charging of multiple electronic devices, for example, 402a, 402b, 402c, 501a, and 501b disposed near and around the single mode non-multi-coupling single protocol wireless power transmitter 800. In this example, a mobile phone 402a, a music player 402b, a camera 402c, a remote control device 501b, and a computer mouse 501a in the vicinity of the wireless power transmitter 800 that is embedded in a pedestal 502a, for example, a base or a stand of the non-portable electronic device 502, house wireless power receivers that operate with the wireless power protocol A1. The wireless power transmitter 800 identifies a match of the wireless power protocol A1 and transmits power to the wireless power receivers in the mobile phone 402a, the music player 402b, the camera 402c, the remote control device 501b, and the computer mouse 501a in mode A and the wireless power protocol A1.

Figure 10:
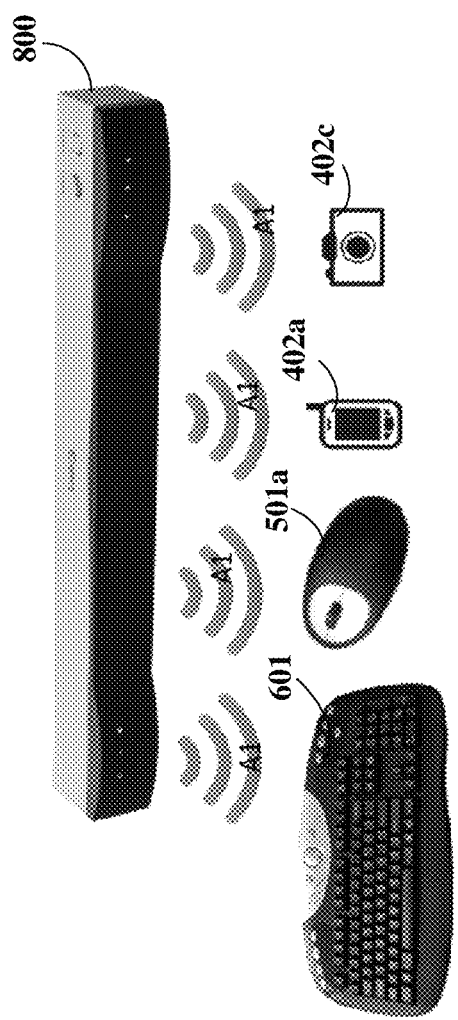
FIG. 10 exemplarily illustrates another embodiment, showing the single mode non-multi-coupling single protocol wireless power transmitter configured as a standalone wireless device that draws power from a wall wart for allowing charging of a single electronic device or for allowing simultaneous charging of multiple electronic devices disposed near and around the single mode single protocol wireless power transmitter.

FIG. 10 exemplarily illustrates another embodiment, showing the single mode non-multi-coupling single protocol wireless power transmitter 800 configured as a standalone wireless device that draws power from a wall wart for allowing charging of a single electronic device, for example, 402a, 402c, 501a, or 601, or for allowing simultaneous charging of multiple electronic devices, for example, 402a, 402c, 501a, and 601 disposed near and around the single mode non-multi-coupling single protocol wireless power transmitter 800. In this example, a computer keyboard 601, a computer mouse 501a, a mobile phone 402a, and a camera 402c in the vicinity of the standalone wireless power transmitter 800, house wireless power receivers that operate with the wireless power protocol A1. The wireless power transmitter 800 identifies a match of the wireless power protocol A1 and transmits power to the wireless power receivers in the computer keyboard 601, the computer mouse 501a, the mobile phone 402a, and the camera 402c in mode A and the wireless power protocol A1.

Figure 11:
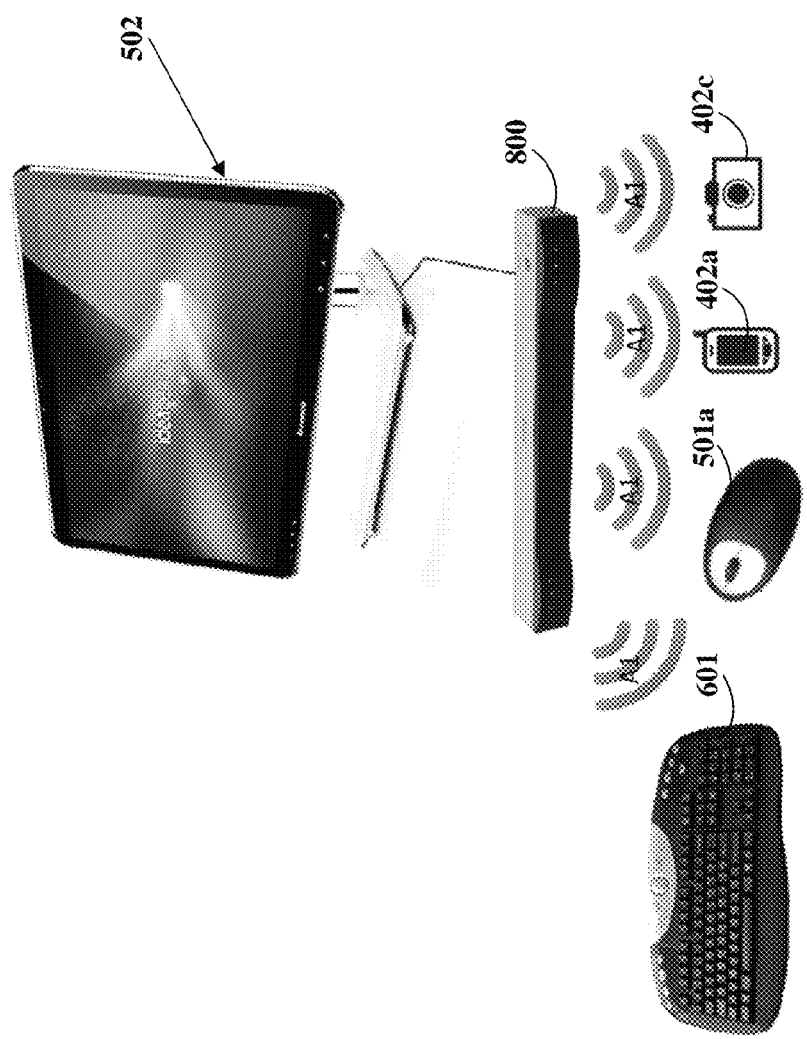
FIG. 11 exemplarily illustrates another embodiment, showing the single mode non-multi-coupling single protocol wireless power transmitter configured as an accessory that draws power from a non-portable electronic device for allowing charging of a single electronic device or for allowing simultaneous charging of multiple electronic devices disposed near and around the single mode single protocol wireless power transmitter.

FIG. 11 exemplarily illustrates another embodiment, showing the single mode non-multi-coupling single protocol wireless power transmitter 800 configured as an accessory that draws power from a non-portable electronic device 502 for allowing charging of a single electronic device, for example, 402a, 402c, 501a, or 601, or for simultaneous charging of multiple electronic devices, for example, 402a, 402c, 501a, and 601 disposed near and around the single mode non-multi-coupling single protocol wireless power transmitter 800. The accessory is, for example, a wireless charging bar or a wireless charging pad containing the single mode non-multi-coupling single protocol wireless power transmitter 800 that can be connected to a portable electronic device or the non portable electronic device 502. As exemplarily illustrated in FIG. 11, a computer keyboard 601, a computer mouse 501a, a mobile phone 402a, and a camera 402c in the vicinity of the wireless power transmitter 800, house wireless power receivers that operate with the wireless power protocol A1. The wireless power transmitter 800 identifies a match of the wireless power protocol A1 and transmits power to the wireless power receivers in the computer keyboard 601, the computer mouse 501a, the mobile phone 402a, and the camera 402c in mode A and the wireless power protocol A1.

FIG. 12 exemplarily illustrates another embodiment for extendably positioning the multi-mode multi-coupling multi-protocol wireless power transmitter 100 in a portable electronic device 401 for allowing charging of a single electronic device, for example, 402a or 402c, or for allowing simultaneous charging of multiple electronic devices, for example, 402a and 402c disposed atop the multi-mode multi-coupling multi-protocol wireless power transmitter 100. The multi-mode multi-coupling multi-protocol wireless power transmitter 100 can be located at different parts of a portable electronic device 401 or a non-portable electronic device and can be flexibly withdrawn, for example, rolled out, popped out, slid out, swiveled out, folded out, etc., of the portable electronic device 401 and the non-portable electronic device. Multiple electronic devices, for example, 402a and 402c may be placed atop the main body extension of the multi-mode multi-coupling multi-protocol wireless power transmitter 100. The integration of the multi-mode multi-coupling multi-protocol wireless power transmitter 100 disclosed herein to roll out, pop out, slide out, fold out, etc., from the portable and non-portable electronic devices enables the multi-mode multi-coupling multi-protocol wireless power transmitter 100 to interoperate smoothly with wireless power protocols. For example, for wireless power protocols that require a strong power coupling linkage, the wireless power receiver can be placed on top of the roll out carriage tray, thereby achieving maximum alignment and coupling between the transmitter and receiver coils. For wireless power protocols that operate even with a weak power coupling linkage, the wireless power receiver can be placed in the vicinity of the roll out carriage tray leading to weaker power coupling. The integration of the multi-mode multi-coupling multi-protocol wireless power transmitter 100 to roll out, pop out, slide out, fold out, etc., from the portable and non-portable electronic devices further enhances the flexibility and ease of usage of the wireless power transmitter 100 and the ubiquity of wireless power.

Consider an example where the multi-mode multi-coupling multi-protocol wireless power transmitter 100 is integrated in a roll out carriage tray of a portable electronic device 401 and configured to support a mode A with an inductor configuration for emanating a magnetic field and two wireless power protocols for mode A, for example, A1 and A2. As an example, a mobile phone 402a and a camera 402c are placed atop the wireless power transmitter 100 for charging. When the wireless power transmitter 100 is turned on, the wireless power transmitter 100 first scans for a wireless power receiver that draws power on mode A and is compliant with the wireless power protocol A1. As the mobile phone 402a houses a wireless power receiver that operates with the wireless power protocol A1, the wireless power transmitter 100 identifies a match of the wireless power protocol A1 and transmits power to the wireless power receiver in the mobile phone 402a in mode A and the wireless power protocol A1 after reconfiguring its circuitry as needed to adapt to the power coupling linkage between the wireless power transmitter 100 and the mobile phone 402a. The wireless power transmitter 100 then sequentially scans for a wireless power receiver that is compliant with the wireless power protocol A2. As the camera 402c, in the vicinity of the wireless power transmitter 100, houses a wireless power receiver that operates with the wireless power protocol A2, the wireless power transmitter 100 identifies a match of the wireless power protocol A2 and transmits power to the wireless power receiver in the camera 402c in mode A and the wireless power protocol A2 after reconfiguring its circuitry as needed to adapt to the power coupling linkage between the wireless power transmitter 100 and the camera 402c.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A multi-mode multi-coupling multi-protocol wireless power transmitter, comprising:

a switch network configured to receive power from a power source;

a variable matching circuit connected to said switch network;

a first circuit connected to said variable matching circuit, said first circuit comprising one of: one or more inductors and one or more capacitors configured to emanate said power via one of a magnetic field and an electric field respectively, wherein said first circuit is configured to transmit said power to a wireless power receiver via one of a plurality of power transfer modes comprising a magnetic field power transfer mode and an electric field power transfer mode;

a modulator/demodulator block and an out-of-band communication block configured to transmit and receive messages to and from said wireless power receiver in one of a plurality of wireless power protocols; and a control logic circuit and an analog to digital converter block, said variable matching circuit, said switch network, said first circuit, and said control logic circuit configured to tune transmission of said power to said wireless power receiver based on a power coupling linkage between said multi-mode multi-coupling multi-protocol wireless power transmitter and said wireless power receiver;

said multi-mode multi-coupling multi-protocol wireless power transmitter configured to sequentially parse one of a plurality of test conditions to identify a power transfer mode of said wireless power receiver, said one of said wireless power protocols of said wireless power receiver, and said power coupling linkage between said multi-mode multi-coupling multi-protocol wireless power transmitter and said wireless power receiver, wherein each of said test conditions comprises instructions to reconfigure a circuit configuration of said multi-mode multi-coupling multi-protocol wireless power transmitter to transmit said power in one of said power transfer modes, to tune said transmission of said power based on said power coupling linkage between said multi-mode multi-coupling multi-protocol wireless power transmitter and said wireless power receiver, and to transmit said messages and interpret said received messages in said one of said wireless power protocols, wherein said reconfiguration of said circuit configuration of said multi-mode multi-coupling multi-protocol wireless power transmitter based on said instructions in one of said sequentially parsed test conditions comprises:
  reconfiguring said first circuit to transmit said power in one of said power transfer modes by selecting one of: said one or more inductors and said one or more capacitors;
  reconfiguring one or more of said switch network, said variable matching circuit, said control logic circuit, and said first circuit to draw, transform, and deliver said power from said power source to said first circuit in a manner optimally suited for said power coupling linkage between said multi-mode multi-coupling multi-protocol wireless power transmitter and said wireless power receiver; and
  reconfiguring one or more of said switch network, said variable matching circuit, said modulator/demodulator block, said out-of-band communication block, and said control logic circuit to adhere to a plurality of aspects of said one of said wireless power protocols;
said multi-mode multi-coupling multi-protocol wireless power transmitter configured to identify a match if one of said power transfer modes of transfer of said power of said first circuit and said one of said wireless power protocols of said switch network, said variable matching circuit, one of said modulator/demodulator block and said out-of-band communication block, and said control logic circuit match said power transfer mode and said one of said wireless power protocols of said wireless power receiver respectively; and
said multi-mode multi-coupling multi-protocol wireless power transmitter configured to transmit said power to said wireless power receiver in said one of said power transfer modes and said one of said wireless power protocols of said wireless power receiver based on said identified match, via said power coupling linkage between said multi-mode multi-coupling multi-protocol wireless power transmitter and said wireless power receiver.

2. The multi-mode multi-coupling multi-protocol wireless power transmitter of claim 1 configured to detect a presence of said wireless power receiver in a vicinity of said multi-mode multi-coupling multi-protocol wireless power transmitter and trigger said sequential parsing of said one of said test conditions.

3. The multi-mode multi-coupling multi-protocol wireless power transmitter of claim 1 configured to be one of: flexibly and extendably positioned in one of a portable electronic device and a non-portable electronic device and integrated into said one of said portable electronic device and said non-portable electronic device for transmitting said power to one or more wireless power receivers, said one or more wireless power receivers being positioned at one or more of a plurality of locations atop, near, and around said multi-mode multi-coupling multi-protocol wireless power transmitter, wherein said multi-mode multi-coupling multi-protocol wireless power transmitter is configured to be flexibly withdrawn from said one of said portable electronic device and said non-portable electronic device.

4. The multi-mode multi-coupling multi-protocol wireless power transmitter of claim 1 configured to be one of plugged into one of a portable electronic device and a non-portable electronic device, integrated into a standalone device that draws power from a wall wart, and configured as a peripheral accessory that draws power from said one of said portable electronic device and said non-portable electronic device for transmitting said power to one or more wireless power receivers, said one or more wireless power receivers being positioned at one or more of a plurality of locations atop, near, and around said multi-mode multi-coupling multi-protocol wireless power transmitter.

5. The multi-mode multi-coupling multi-protocol wireless power transmitter of claim 1, wherein said power coupling linkage between said multi-mode multi-coupling multi-protocol wireless power transmitter and said wireless power receiver is one of a magnetic flux field linkage and an electrostatic field linkage.

6. The multi-mode multi-coupling multi-protocol wireless power transmitter of claim 1, wherein said power coupling linkage between said multi-mode multi-coupling multi-protocol wireless power transmitter and said wireless power receiver is identified based on one of a voltage, a current, and a phase angle between a current and a voltage in said first circuit, said variable matching circuit, and said switch network.

7. The multi-mode multi-coupling multi-protocol wireless power transmitter of claim 1, wherein said power coupling linkage between said multi-mode multi-coupling multi-protocol wireless power transmitter and said wireless power receiver is identified based on said received messages from said wireless power receiver.

8. The multi-mode multi-coupling multi-protocol wireless power transmitter of claim 1 configured to compensate for said identified power coupling linkage between said multi-mode multi-coupling multi-protocol wireless power transmitter and said wireless power receiver by one of: signaling its voltage source to increase an input voltage provided by said voltage source to said multi-mode multi-coupling multi-protocol wireless power transmitter, reconfiguring an inverter topology of said switch network, reconfiguring said first circuit to reduce a reactive impedance seen by said switch network when looking into said variable matching circuit, and reconfiguring said variable matching circuit to reduce said reactive impedance seen by said switch network when looking into said variable matching circuit.

9. The multi-mode multi-coupling multi-protocol wireless power transmitter of claim 1, configured to compensate for said identified power coupling linkage between said multi-mode multi-coupling multi-protocol wireless power transmitter and said wireless power receiver by reconfiguring one of a frequency and a duty cycle of a pulse width modulation signal supplied by said control logic circuit to said switch network.

10. The multi-mode multi-coupling multi-protocol wireless power transmitter of claim 1 configured as one of a multi-mode multi-coupling multi-protocol wireless power transmitter, a single mode non-multi-coupling single protocol wireless power transmitter, a single mode multi-coupling multi-protocol wireless power transmitter, a single mode multi-coupling single protocol wireless power transmitter, a single mode non-multi-coupling multi-protocol wireless power transmitter, and a multi-mode non-multi-coupling multi-protocol wireless power transmitter.

11. A method for transmitting power from a wireless power transmitter to a wireless power receiver in a power transfer mode and a wireless power protocol of said wireless power receiver, said method comprising:
providing said wireless power transmitter comprising:
a switch network configured to receive power from a power source;
a variable matching circuit connected to said switch network;
a first circuit connected to said variable matching circuit, said first circuit comprising one of: one or more inductors and one or more capacitors configured to emanate said power via one of a magnetic field and an electric field respectively, wherein said first circuit is configured to transmit said power to said wireless power receiver via one of a plurality of power transfer modes comprising a magnetic field power transfer mode and an electric field power transfer mode;
a modulator/demodulator block and an out-of-band communication block configured to transmit and receive messages to and from said wireless power receiver in one of a plurality of wireless power protocols; and
a control logic circuit and an analog to digital converter block, said variable matching circuit, said switch network, said first circuit, and said control logic circuit configured to tune transmission of said power to said wireless power receiver based on a power coupling linkage between said wireless power transmitter and said wireless power receiver;
detecting a presence of said wireless power receiver in a vicinity of said wireless power transmitter, by said wireless power transmitter;
sequentially parsing one of a plurality of tests conditions to identify a power transfer mode of said wireless power receiver, said one of said wireless power protocols of said wireless power receiver, and said power coupling linkage between said wireless power transmitter and said wireless power receiver, wherein each of said test conditions comprises instructions to reconfigure a circuit configuration of said wireless power transmitter to transmit said power in one of said power transfer modes, to tune said transmission of said power based on said power coupling linkage between said wireless power transmitter and said wireless power receiver, and to transmit said messages and interpret said received messages in one of said wireless power protocols, wherein said reconfiguration of said circuit configuration of said wireless power transmitter based on said instructions in one of said sequentially parsed test conditions comprises:
reconfiguring said first circuit to transmit said power in one of said power transfer modes by selecting one of: said one or more inductors and said one or more capacitors;
reconfiguring one or more of said switch network, said variable matching circuit, said control logic circuit, and said first circuit to draw, transform, and deliver said power from said power source to said first circuit in a manner optimally suited for said power coupling linkage between said wireless power transmitter and said wireless power receiver; and
reconfiguring one or more of said switch network, said variable matching circuit, said modulator/demodulator block, said out-of-band communication block, and said control logic circuit to adhere to a plurality of aspects of said one of said wireless power protocols;
identifying a match if one of said power transfer modes of transfer of said power of said first circuit and said one of said wireless power protocols of said switch network, said variable matching circuit, one of said modulator/demodulator block and said out-of-band communication block, and said control logic circuit match said power transfer mode and said one of said wireless power protocols of said wireless power receiver respectively; and
transmitting said power from said wireless power transmitter to said wireless power receiver in said one of said power transfer modes and said one of said wireless power protocols of said wireless power receiver based on said identified match, via said power coupling linkage between said wireless power transmitter and said wireless power receiver.

12. The method of claim 11, wherein said control logic circuit identifies said power transfer mode and said one of said wireless power protocols of said wireless power receiver in conjunction with said one of said modulator/demodulator block and said out-of-band communication block.

13. The method of claim 11, wherein said wireless power transmitter is configured to be one of extendably positioned in, flexibly withdrawn from, integrated into, and plugged into one of a portable electronic device and a non-portable electronic device, for transmitting said power to one or more wireless power receivers, said one or more wireless power receivers being positioned at one or more of a plurality of locations atop, near, and around said wireless power transmitter.

14. The method of claim 11, wherein said wireless power transmitter is configured to be one of a peripheral accessory that draws power from one of a portable electronic device and a non-portable electronic device and a subsystem integrated into a standalone device that draws power from a wall wart for transmitting said power to one or more wireless power receivers, said one or more wireless power receivers being positioned at one or more of a plurality of locations atop, near, and around said wireless power transmitter.

15. The method of claim 11, wherein said power coupling linkage between said wireless power transmitter and said wireless power receiver is one of a magnetic flux field linkage and an electrostatic field linkage.

16. The method of claim 11, wherein said power coupling linkage between said wireless power transmitter and said wireless power receiver is identified based on one of a voltage, a current and a phase angle between a voltage and a current in said first circuit, said variable matching circuit, and said switch network.

17. The method of claim 11, wherein said power coupling linkage between said wireless power transmitter and said wireless power receiver is identified based on said received messages from said wireless power receiver.

18. The method of claim 11, wherein said wireless power transmitter compensates for said identified power coupling linkage between said wireless power transmitter and said wireless power receiver by one of signaling its voltage source to increase an input voltage provided by said voltage source to said wireless power transmitter, reconfiguring an inverter topology of said switch network in said wireless power transmitter, reconfiguring said variable matching circuit to reduce a reactive impedance seen by said switch network when looking into said variable matching circuit in said wireless power transmitter, and reconfiguring said first circuit to reduce said reactive impedance seen by said switch network when looking into said variable matching circuit in said wireless power transmitter.

19. The method of claim 11, wherein said wireless power transmitter compensates for said identified power coupling linkage between said wireless power transmitter and said wireless power receiver by reconfiguring one of a frequency of a pulse width modulation signal and a duty cycle of said pulse width modulation signal supplied by said control logic circuit to said switch network.

20. The method of claim 11, wherein said wireless power transmitter is configured as one of a multi-mode multi-coupling multi-protocol wireless power transmitter, a single mode non-multi-coupling single protocol wireless power transmitter, a single mode multi-coupling multi-protocol wireless power transmitter, a single mode multi-coupling single protocol wireless power transmitter, a single mode non-multi-coupling multi-protocol wireless power transmitter and a multi-mode non-multi-coupling multi-protocol wireless power transmitter.

* * * * *